(12) United States Patent
Wright et al.

(10) Patent No.: US 9,076,589 B2
(45) Date of Patent: Jul. 7, 2015

(54) IONIC GEL ELECTROLYTE, ENERGY STORAGE DEVICES, AND METHODS OF MANUFACTURE THEREOF

(71) Applicants: THE REGENTS OF THE UNIVERSITY OF CALIFORNIA, Oakland, CA (US); IMPRINT ENERGY, INC., Alameda, CA (US)

(72) Inventors: Paul K. Wright, Oakland, CA (US); James W. Evans, Piedmont, CA (US); Christine Ho, Fremont, CA (US)

(73) Assignees: THE REGENTS OF THE UNIVERSITY OF CALIFORNIA, Oakland, CA (US); IMPRINT ENERGY, INC., Alameda, CA (US)

( * ) Notice: Subject to any disclaimer, the term of this patent is extended or adjusted under 35 U.S.C. 154(b) by 27 days.

(21) Appl. No.: 13/784,935

(22) Filed: Mar. 5, 2013

(65) Prior Publication Data
US 2013/0280579 A1 Oct. 24, 2013

Related U.S. Application Data

(63) Continuation of application No. PCT/US2011/051469, filed on Sep. 13, 2011.

(60) Provisional application No. 61/382,027, filed on Sep. 13, 2010.

(51) Int. Cl.
*H01M 6/40* (2006.01)
*H01M 6/04* (2006.01)
(Continued)

(52) U.S. Cl.
CPC .......... *H01G 9/0029* (2013.01); *Y10T 29/49108* (2015.01); *Y10T 29/49115* (2015.01);
(Continued)

(58) Field of Classification Search
CPC .............. Y02E 60/122; H01M 10/052; H01M 10/0525; H01M 10/0565; H01M 6/40; H01M 2300/0045; H01M 2300/0085; H01G 9/035; H01G 9/145
USPC .......................... 429/124, 188, 300, 302, 303
See application file for complete search history.

(56) References Cited

U.S. PATENT DOCUMENTS 3,993,508 A 11/1976 Erlichman
5,540,742 A 7/1996 Sangyoji et al.
(Continued)

FOREIGN PATENT DOCUMENTS

| EP | 1449886 A1 | 8/2004 |
| EP | 2071584 A1 | 6/2009 |
| WO | 0180338 A1 | 10/2001 |

OTHER PUBLICATIONS

Ho, et al. "Direct write dispenser printing of a zinc microbattery with an ionic liquid gel electrolyte," J. Micromech. Microeng. vol. 20, Sep. 14, 2010, pp. 104009.

Ho, "Dispenser Printed Zinc Microbattery with an Ionic Liquid Gel Electrolyte," Dissertation Engineering—Materials Science and Engineering, University of California, Berkeley. Fall 2010, pp. 1-105.

(Continued)

*Primary Examiner* — Stewart Faser
(74) *Attorney, Agent, or Firm* — John P. O'Banion

(57) ABSTRACT

An electrochemical cell includes solid-state, printable anode layer, cathode layer and non-aqueous gel electrolyte layer coupled to the anode layer and cathode layer. The electrolyte layer provides physical separation between the anode layer and the cathode layer, and comprises a composition configured to provide ionic communication between the anode layer and cathode layer by facilitating transmission of multivalent ions between the anode layer and the cathode layer.

20 Claims, 23 Drawing Sheets

(51) Int. Cl.

| | |
|---|---|
| *H01G 9/00* | (2006.01) |
| *H01B 1/12* | (2006.01) |
| *H01M 10/0565* | (2010.01) |
| *H01G 9/035* | (2006.01) |
| *H01G 9/145* | (2006.01) |
| *H01M 10/054* | (2010.01) |
| *H01G 11/56* | (2013.01) |
| *H01M 10/058* | (2010.01) |
| *H01M 10/04* | (2006.01) |

(52) U.S. Cl.
CPC ............... *Y10T29/417* (2015.01); *H01B 1/122* (2013.01); *H01M 10/0565* (2013.01); *H01M 2300/0045* (2013.01); *H01M 2300/0085* (2013.01); *H01G 9/035* (2013.01); *H01G 9/145* (2013.01); *H01M 6/40* (2013.01); *H01M 10/0436* (2013.01); *H01M 10/054* (2013.01); *H01G 11/56* (2013.01); *H01M 10/058* (2013.01); *Y02E 60/13* (2013.01)

(56) References Cited

U.S. PATENT DOCUMENTS

| | | | |
|---|---|---|---|
| 5,643,490 | A | 7/1997 | Takahashi et al. |
| 5,654,640 | A | 8/1997 | Bailey |
| 5,865,860 | A | 2/1999 | Delnick |
| 5,912,759 | A | 6/1999 | Good et al. |
| 6,294,111 | B1 | 9/2001 | Shacklett, III et al. |
| 6,316,142 | B1 | 11/2001 | Delnick et al. |
| 6,369,793 | B1 | 4/2002 | Parker |
| 6,780,208 | B2 | 8/2004 | Hopkins et al. |
| 6,986,199 | B2 | 1/2006 | Arnold et al. |
| 7,277,770 | B2 | 10/2007 | Huang |
| 7,320,845 | B2 | 1/2008 | Zucker |
| 7,335,441 | B2 | 2/2008 | Luski et al. |
| 7,449,033 | B2 | 11/2008 | Ward et al. |
| 7,501,208 | B2 | 3/2009 | Feddrix et al. |
| 7,579,112 | B2 | 8/2009 | Chiang et al. |
| 8,236,446 | B2 * | 8/2012 | Lu ................................ 429/209 |
| 2002/0102465 | A1 | 8/2002 | Chen et al. |
| 2003/0211389 | A1 | 11/2003 | Schlaikjer |
| 2004/0191617 | A1 | 9/2004 | Visco et al. |
| 2006/0210873 | A1 * | 9/2006 | Hollenkamp et al. ......... 429/200 |
| 2006/0216586 | A1 | 9/2006 | Tucholski |
| 2006/0251965 | A1 * | 11/2006 | Nagayama et al. ............ 429/209 |
| 2007/0184576 | A1 | 8/2007 | Chang et al. |
| 2008/0063931 | A1 | 3/2008 | Zucker |
| 2009/0075176 | A1 | 3/2009 | Singh et al. |
| 2009/0173632 | A1 * | 7/2009 | Nagayama et al. ............. 205/98 |
| 2009/0246625 | A1 * | 10/2009 | Lu ................................ 429/207 |
| 2012/0034515 | A1 | 2/2012 | Kang et al. |
| 2014/0059820 | A1 | 3/2014 | Wright et al. |

OTHER PUBLICATIONS

Kumar and Sampath Electrochemical Characterization of a Zinc-Based Gel-Polymer Electrolyte and Its Application in Rechargeable Batteries. J. Electrochem. Soc. Jun. 2003; vol. 150, Issue 5, pp. A608-A615.
Kumar and Sampath, "Electrochemical characterization of poly(vinylidenefluoride)-zinc triflate gel polymer electrolyte and its application in solid-state zinc batteries," Solid State Ionics. Jun. 2003; vol. 160, pp. 289-300.
Song, et al. "Review of gel-type polymer electrolytes for lithium-ion batteries," Journal of Power Sources, Feb. 1999; vol. 77: pp. 183-197.
Xu, et al. "Energetic Zinc Ion Chemistry: The Rechargeable Zinc Ion Battery," with supporting information, Angew. Chem Int. Dec. 13, 2011; pp. 933-935.
Xu, et al. "Novel zinc ion conducting polymer gel electrolytes based on ionic liquids," Electrochemistry Communications, Oct. 21, 2005; pp. 1309-1317.
Ye, et al. "Zinc ion conducting polymer electrolytes based on oligomeric polyether/PVDF-HFP blends," Journal of Power Sources. Nov. 20, 2007; pp. 500-508.
Korean Intellectual Property Office, International Search Report and Written Opinion, issued on Apr. 20, 2012 for corresponding International Patent Application No. PCT/US2011/051469 (pp. 1-11) with claims searched (pp. 12-22) pp. 1-22.
Ho, C., et al. "Direct write dispenser printed energy storage devices," The Minerals, Metals and Materials Society, Apr. 5, 2010, pp. 317-324.
Ho, C., et al. "Direct Write Dispenser Printing of Zinc Microbatteries," PowerMEMS 2009, Washington DC, USA, Dec. 1-4, 2009, pp. 141-144.
European Patent Office, European Supplementary Search Report (ESSR) issued on Jan. 28, 2014 for corresponding European Patent Application No. EP11 82 5825 (PCT Application No. PCT/US2011051469), (pp. 1-8) with claims searched (pp. ) pp.
Forsyth, et al. "Ionic liquids—An overview," Australian journal of Chemistry, vol. 57, pp. 113-119, Feb. 2, 2004.
Ho, et al. Direct write dispenser printed energy storage devices. Micro and Nanotechnology Sensors, Systems and Application II. Proceedings of the SPIE, vol. 7679, id. 76792A, Apr. 2010.
Ho, et al. "Printed energy storage devices for micro-power supplies." Naval Research Laboratory. May 25, 2010.
McEwen, et al. "Electrochemical properties of imidazolium salt electrolytes for electrochemical capacitor applications." Journal of the Electrochemical Society, 146 (5) 1687-1695 (1999).
Bates, et al. Thin-film lithium and lithium-ion batteries. Solid State Ionics. 2000; 135:33-45.
Ho, et al. A super ink jet printed zinc-silver 3D microbattery J. Micromech. Microeng. 19:094013. Aug. 26, 2009.
Ho, et al. Dispenser printed electrochemical capacitors for power management of millimeter scale lithium ion polymer microbatteries for wireless sensors. Proc. 6th Int. Workshop on Micro and Nanotechnology for Power Generation and Energy Conversion Applications pp. 219-22. Nov. 29-Dec. 1, 2006.
Ho, et al. Tailoring electrochemical capacitor energy storage using direct write dispenser printing ECS Trans. 16 35-47. Oct. 14, 2008.
Ho, et al. Technologies for an autonomous home healthcare system Proc. 6th Int. Workshop on Wearable and Implantable Body Sensor Networks pp. 29-34. Jun. 3-5, 2009.
Ho. Pneumatic Dispenser Printed Electrochemical Capacitors. Masters Thesis, University of California, Berkeley, Materials Science and Engineering. 2007.
Miller, et al. Integration of a low frequency, tunable MEMS piezoelectric energy harvester and a thick film micro capacitor as a power supply system for wireless sensor nodes. In Energy Conversion Congress and Exposition, 2009. ECCE Sep. 2009. IEEE (pp. 2627-2634).
Steingart, et al. Dispenser Printing of Solid Polymer—Ionic Liquid Electrolytes for Lithium Ion Cells in 6th International IEEE Conference on Polymers and Adhesives in Microelectronics and avionics (Polytronic 2007), Oadaiba, Tokyo, Japan, 2007, pp. 261-264. Jan. 15-18, 2007.
Wright, et al. Dispenser printing for prototyping microscale devices Trans. NAMRI/SME. 2010; 38:555-61.
State Intellectual Property Office of the People's Republic of China, first Office Action issued on Dec. 2, 2014 for corresponding Chinese Patent Application No. 2011800485539. Original Office Action in Chinese pp. 1-14; the English Translation pp. 15-21 and pending claims pp. 22-31.
Ho CC, Evans JW, and Wright PK, "Direct Write Dispenser Printed Energy Storage Devices" The Jim Evans Honorary Symposium, TMS, Seattle, WA Feb. 2010, pp. 317-324.
Ho, "Dispenser Printed Zinc Microbattery with an Ionic Liquid Gel Electrolyte," Dissertation Engineering—Materials Science and Engineering, University of California, Berkeley. Fall 2010, pp. 1-205.
Ho, et al. "Direct write dispenser printed energy storage devices." Micro and Nanotechnology Sensors, Systems and Application II. Proceedings of the SPIE, vol. 7679, id. 76792A, Orlando Florida, Apr. 5, 2010.
United States Patent and Trademark Office, Non-Final Office Action issued on May 8, 2015 for corresponding U.S. Appl. No. 13/968,603 (pp. 1-10) and claims (11-14).

* cited by examiner

IONIC GEL ELECTROLYTE, ENERGY STORAGE DEVICES, AND METHODS OF MANUFACTURE THEREOF

CROSS-REFERENCE TO RELATED APPLICATIONS

This application is a 35 U.S.C. §111(a) continuation of PCT international application number PCT/US2011/051469 filed on Sep. 13, 2011, incorporated herein by reference in its entirety, which is a nonprovisional of U.S. provisional patent application Ser. No. 61/382,027 filed on Sep. 13, 2010, incorporated herein by reference in its entirety. Priority is claimed to each of the foregoing applications.

The above-referenced PCT international application was published as PCT International Publication No. WO 2012/037171 on Mar. 22, 2012 and republished on Aug. 2, 2012, and said publications are incorporated herein by reference in their entirety.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND OF THE INVENTION

1. Field of the Invention

This invention relates generally to electrochemical cells, and, more specifically, to ionic liquid gel electrolyte chemistries and methods of making batteries that can be used with devices as single-use or rechargeable power sources.

2. Description of Related Art

The reduction of electronic device form factors and their power demands have made it possible to realize new devices that are thin, compact, and lightweight. The evolution of portable devices can be in part attributed to the combination of the advancements in battery electrode materials and their compatibility with electrolyte materials. For example, the development of more effective high energy density lithium and lithium-ion electrode materials has enabled portable, compact, high capacity batteries, while the introduction of lithium and lithium-ion solid polymer and gel electrolytes has relaxed the battery's requirement for rigid and hard packaging, spurring the wide-spread adoption of thinner batteries, hermetically sealed within pouch material. In addition to performance and form factor benefits, the use of solid-state, polymer, and gel electrolytes have introduced additional improvements in battery manufacturability, cost, and inherent safety. Thus, considerable efforts have been dedicated to solid-state, polymer, and gel electrolyte development.

The demand for thin, miniature, and low cost batteries has been propelled by the increased ubiquity of low power sensors, wireless devices, and printed electronics. The reduction of electronic device form factors and their power demands have made it possible to realize a fully-integrated microdevice platform, with computation, communication, and sensing capabilities all enabled by an integrated power source. In particular, MEMS-based sensors and actuators, especially in autonomous, integrated platforms known as "smart dust" have been huge drivers in the development of thin format battery and microbattery technology. The implications of the widespread deployment of these devices, especially autonomous wireless sensor nodes, is pivotal to a variety of fields including the "internet of things", wearable electronics to enable the "quantified self", smart labels, intelligent toys, structural monitoring, and cost- and energy-effective regulation of home, industry, and office energy use applications, to name a few. These broad classes of devices require power sources that can supply power in the range of microwatts ($\mu W$) to hundreds of milliwatts (mW), and capacities from microamp-hours ($\mu Ah$) to hundreds of milliamp-hours (mAh), depending on the application. In addition, for many of the portable or ubiquitous applications, it is desired that the power source is no greater in size than the device it powers, and thin in form factor. Finally, low cost and mass-manufacturable solutions are critical.

Of the existing battery systems that are being considered for these applications, thin film, lithium polymer, and semi-printed batteries are the forerunners, though each have significant shortcomings that have limited their widespread adoption. Vapor deposited thin film lithium and lithium-ion batteries have low storage capacities and power capabilities due to materials deposition limitations. Lithium polymer batteries have leveraged the rapid advancements of pouch cell battery manufacturing, but like thin film lithium and lithium-ion batteries, are plagued by stringent hermetic encapsulation requirements due to its sensitivity to contamination from the environment. Semi-printed batteries often utilize a liquid electrolyte, adding cell geometry and manufacturing complexities.

Such microdevices need power sources with footprints less than 1 $cm^2$ and thicknesses on the order of a few mm or less, that can supply power in the range of microwatts ($\mu W$) to milliwatts (mW), depending on the application. The need for a micropower source that can satisfy the power requirements of such wireless devices and with comparable dimensions has incited a surge of research within the fields of microfabrication, energy harvesting, and energy storage. For autonomous wireless sensors, the microenergy storage devices currently being considered are microbatteries and microcapacitors.

Although microbattery chemistries may be similar to macrobattery chemistries, macrobattery configurations, packaging, and post-processing are not feasible below the centimeter scale. As a result, in addition to materials optimization, microbattery researchers have focused heavily on integrating microbatteries directly onto the same substrates as the devices they are powering.

An ideal microbattery (or microcapacitor) solution has not yet been found. Nickel-zinc systems have the problem that zinc dendrites grow, and the shape of the electrode changes during cycling, thus reducing cycle life. Rechargeable alkaline manganese cells and zinc-silver oxide cells have the same problem. Lithium-ion and lithium polymer systems require strict charge and discharge regulation and pose flammability risks.

What is needed is a safe, long-lasting, inexpensive micropower source that can enable microdevices to be used in a wide variety of applications.

BRIEF SUMMARY OF THE INVENTION

In one aspect of the present invention, a polymer is swelled with a room temperature ionic liquid electrolyte to form a non-aqueous gel to replace the traditional alkaline and acidic liquid electrolyte (and separator) of a zinc-metal oxide battery.

In another aspect of the invention, a printed battery is fabricated from an ionic liquid gel electrolyte sandwiched between a zinc electrode and a metal oxide electrode.

In a further aspect of the invention, an electrochemical cell, comprises an anode layer; a cathode layer; and a non-aqueous gel electrolyte layer coupled to the anode layer and cathode layer; wherein the electrolyte layer provides physical separation between the anode layer and the cathode layer and comprises a polymer into which at least one ionic liquid and an electrolyte salt have been imbibe. The electrolyte layer comprising a composition configured to provide ionic communication between the anode layer and cathode layer by facilitating transmission of multivalent ions between the anode layer and the cathode layer.

Another aspect is an electrolyte configured to provide physical separation between an anode and the cathode of an electromechanical cell. The electrolyte includes a room temperature ionic liquid electrolyte imbibed into a polymer to form a non-aqueous gel, wherein the electrolyte is configured to provide ionic communication between the anode and cathode by facilitating transmission of multivalent ions across the electrolyte.

A further aspect is method of fabricating an electrochemical cell comprising the steps of: providing a first electrode ink and a second electrode ink; providing liquid electrolyte ink; printing a first electrode layer of the first electrode ink; printing a layer of electrolyte ink; and printing a second electrode layer of second electrode ink. The layer of electrolyte ink provides physical separation between the first electrode layer and second electrode layer to form an electrochemical cell, and is configured to provide ionic communication between the first electrode layer and second layer by facilitating transmission of multivalent ions between the first electrode layer and the second electrode layer.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

Figure 18:
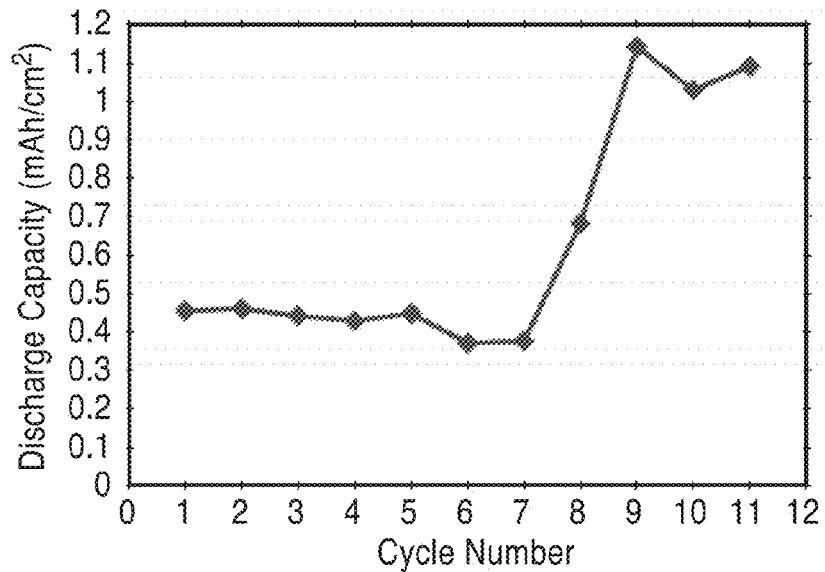

FIG. 18 shows the first eleven galvanostatic cycles of a cell containing a printed $MnO_2$ composite electrode, gel electrolyte, and zinc foil electrode. A C/5 discharge rate was used. Between cycle 7 and cycle 9 a significant discharge capacity increase is observed.

Figure 19A:
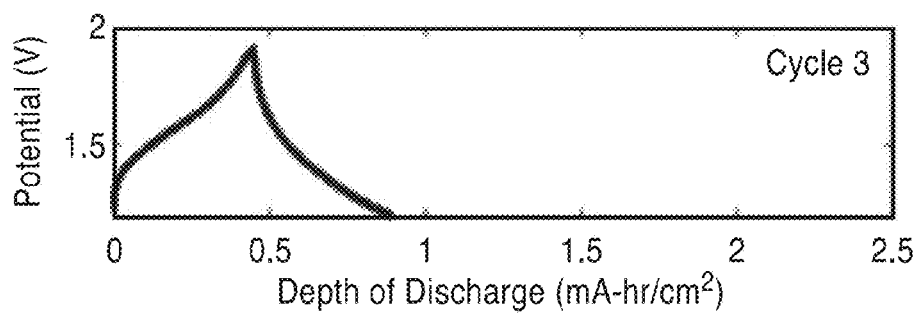
Figure 19B:
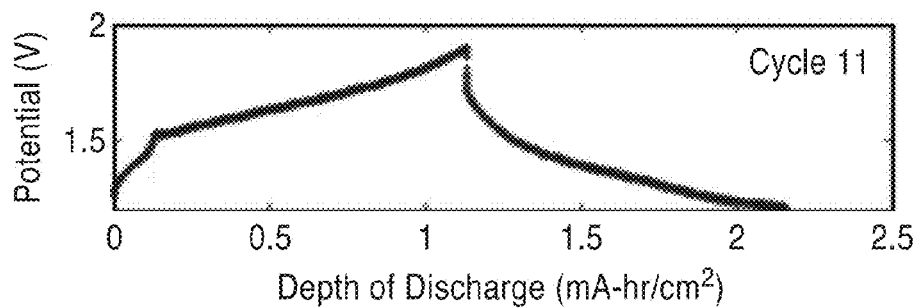

FIGS. 19A and 19B show a comparison of the potential of a printed $MnO_2$ electrode, gel electrolyte, and zinc foil electrode cell. The galvanostatic charge (FIG. 19A, increasing cell potential) and discharge (FIG. 19B, decreasing cell potential) potentials of the third and eleventh cycle are compared.

Figure 20:
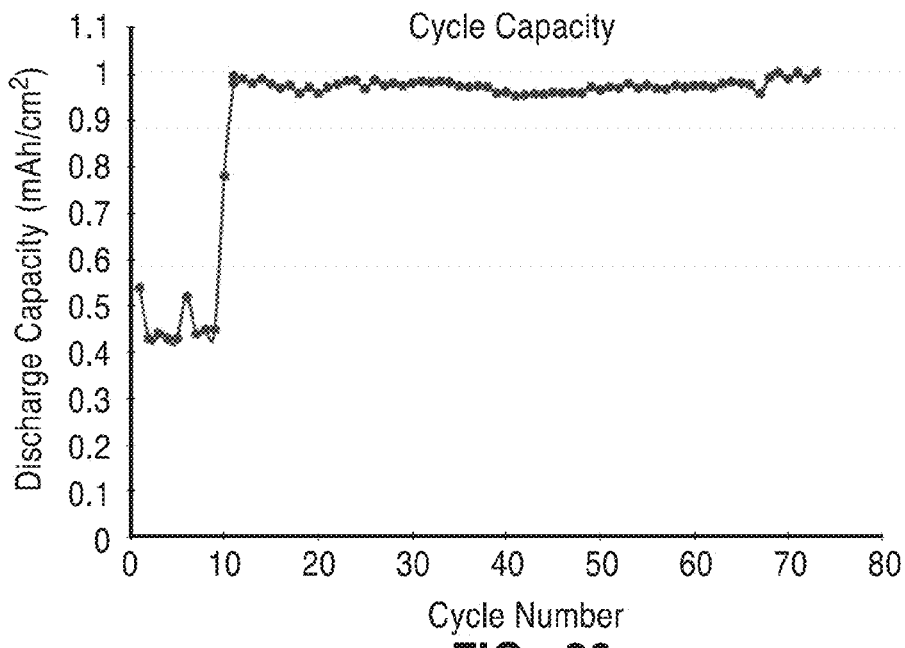

FIG. 20 illustrates the galvanostatic cycling of a printed zinc, gel electrolyte, and $MnO_2$ microbattery at a C/5 rate. Activation of the battery occurs within the first 15 cycles. After more than 70 cycles no sign of performance degradation is visible.

Figure 21:
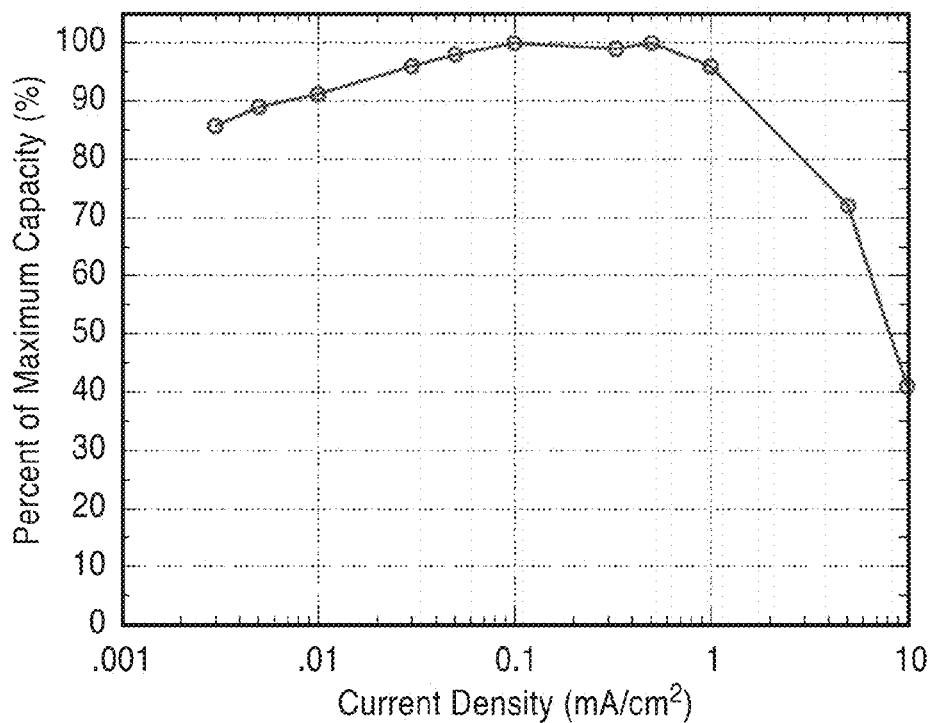

FIG. 21 shows the percent of maximum discharge capacity extracted from the printed microbattery as a function of discharge current density.

Figure 22:
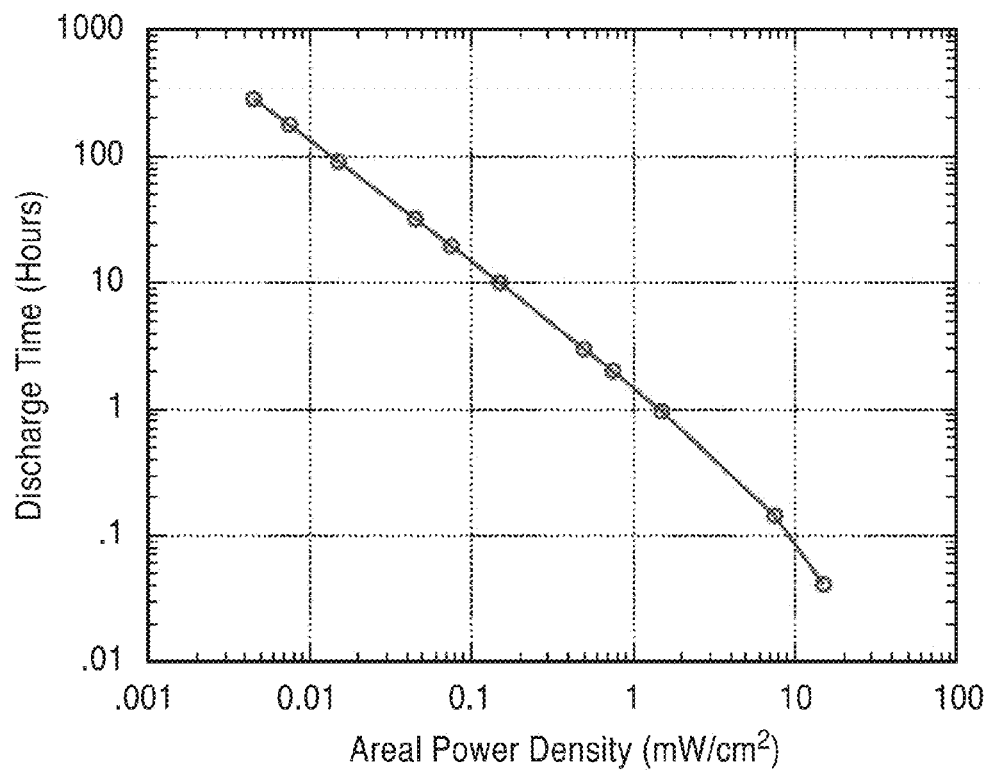

FIG. 22 illustrates printed microbattery discharge time as a function of discharge power density.

Figure 23:
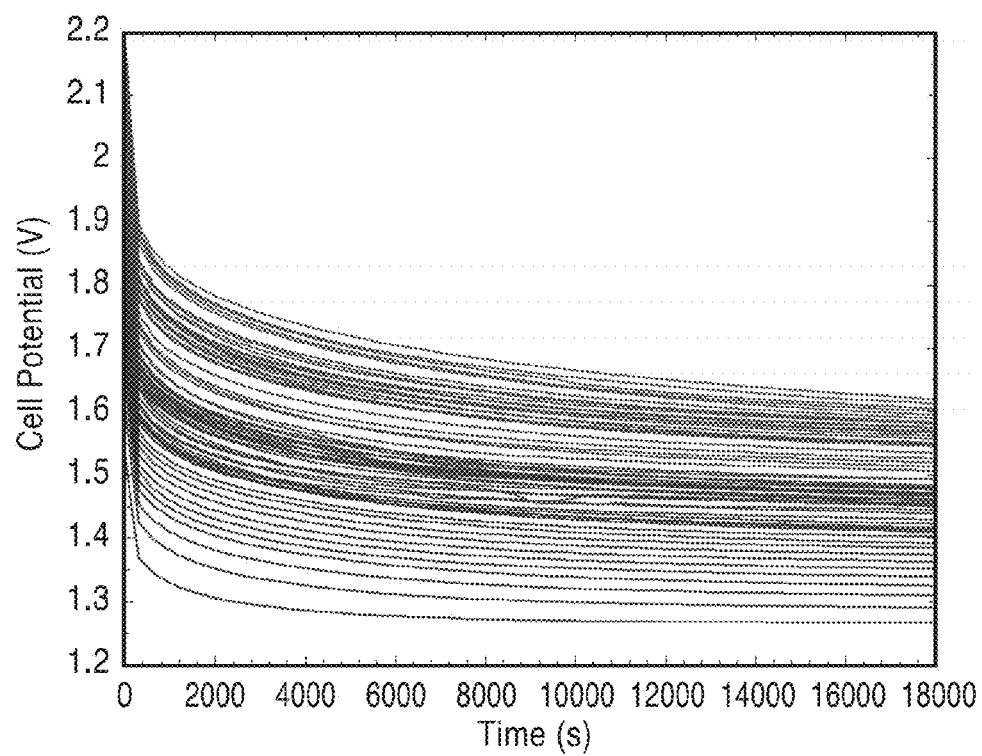

FIG. 23 shows a series of self-discharge routines of the printed microbattery after charging. Potential decay at open circuit is plotted with respect to time.

Figure 24:
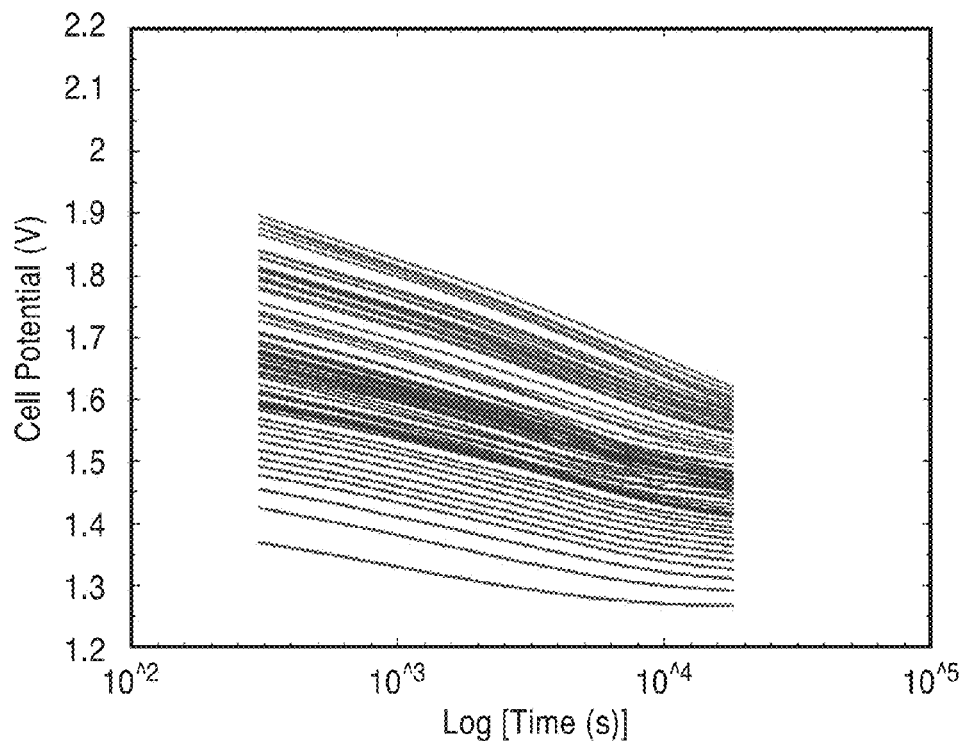

FIG. 24 is a series of self-discharge routines of the printed microbattery after charging. Potential decay at open circuit is plotted with respect to the logarithm of time.

Figure 25:
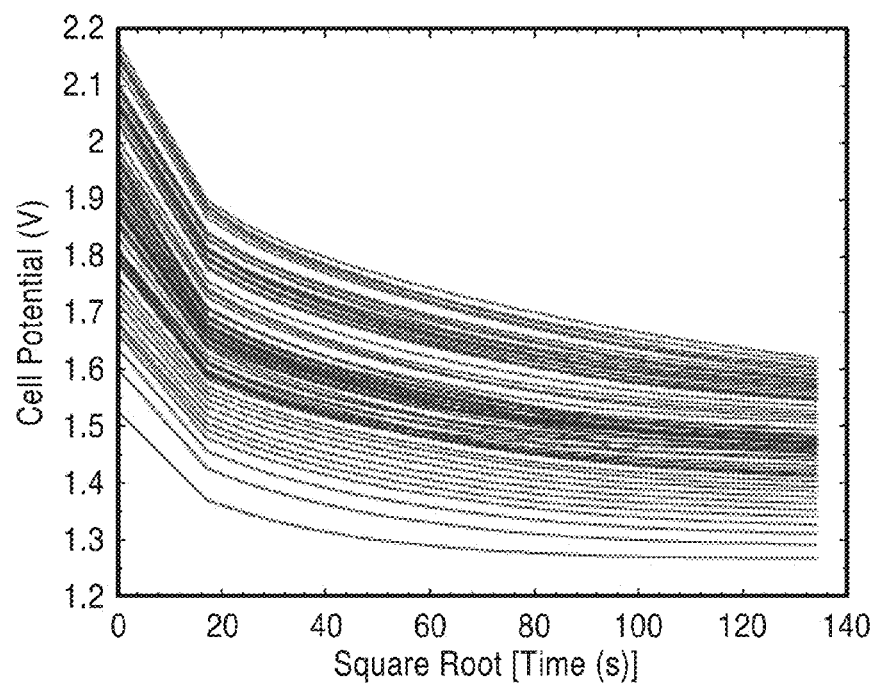

FIG. 25 shows a series of self-discharge routines of the printed microbattery after charging. Potential decay at open circuit is plotted with respect to the square root of time.

Figure 26:
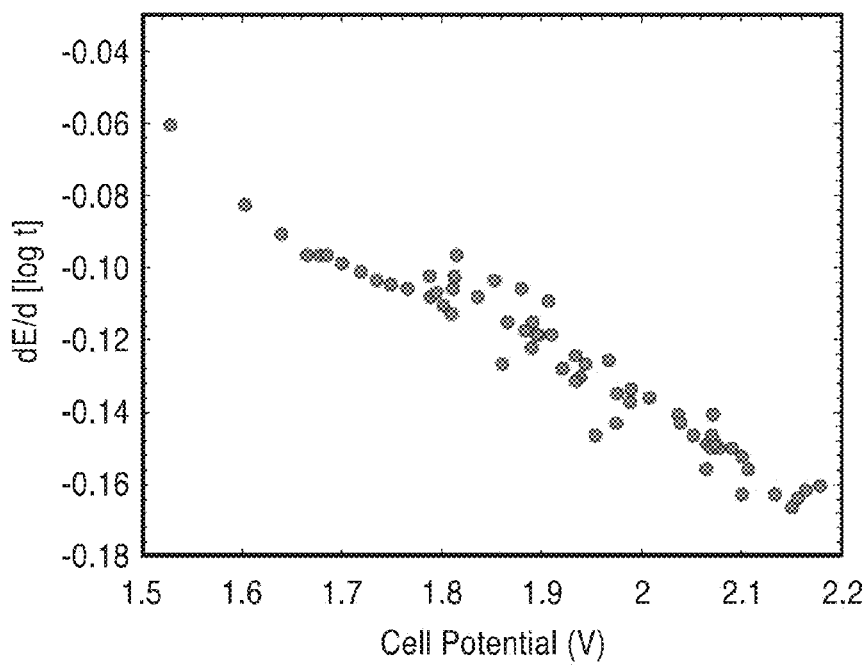

FIG. 26 illustrates the Magnitudes of self-discharge of the printed microbattery due to charging. The slope of the potential decay at open circuit is plotted with respect to the logarithm of time as a function of cell potential.

Figure 27:
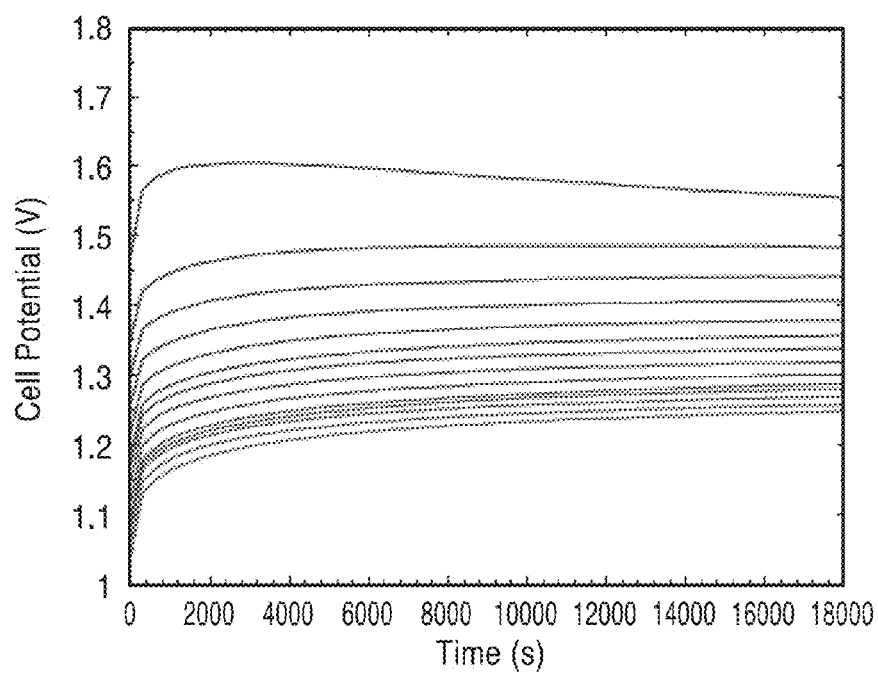

FIG. 27 is a series of self-recovery routines of the printed microbattery after discharging. Potential recovery at open circuit is plotted with respect to the square root of time.

Figure 28:
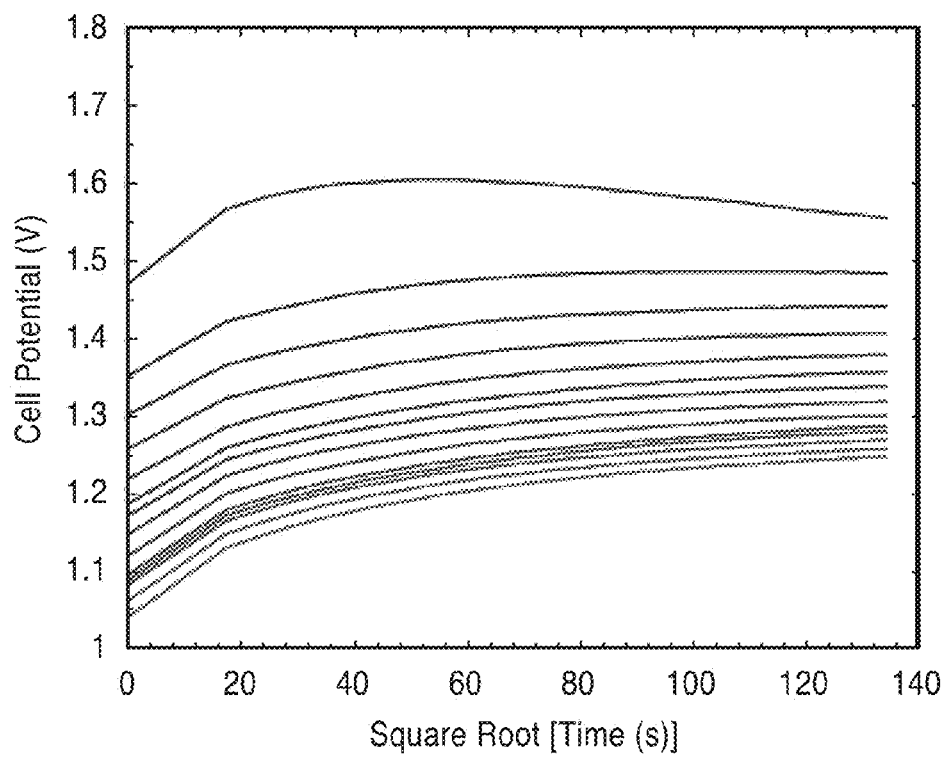

FIG. 28 is a series of self-recovery routines of the printed microbattery after discharging. Potential recovery at open circuit is plotted with respect to time.

Figure 29:
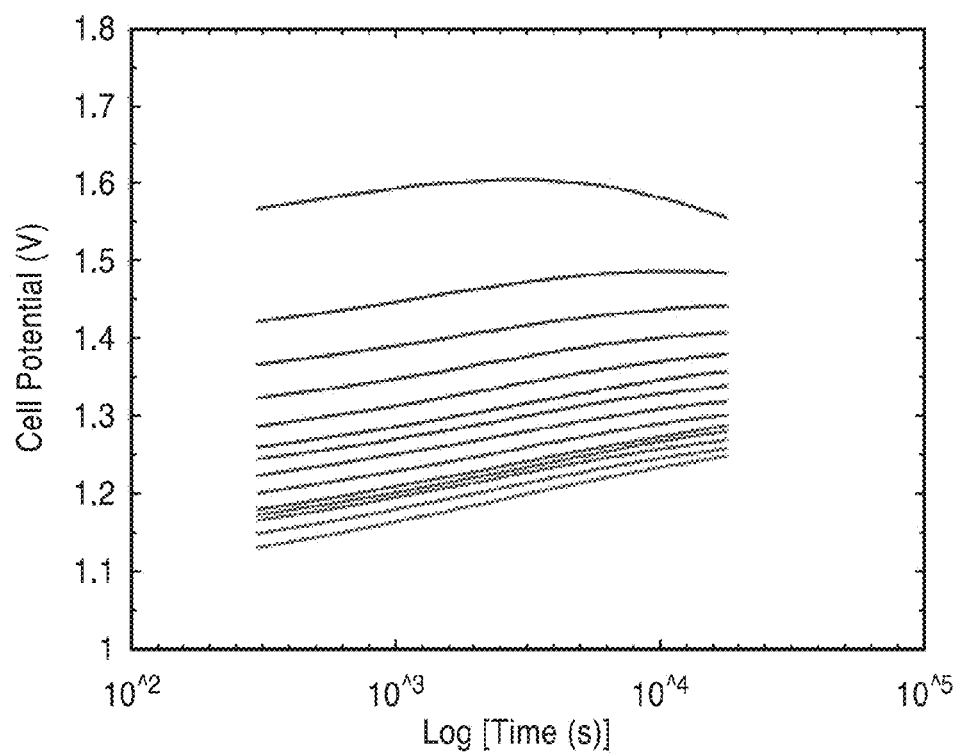

FIG. 29 shows a series of self-recovery routines of the printed microbattery after discharging. The potential recovery of the battery at open circuit is plotted with respect to the logarithm of time.

Figure 30:
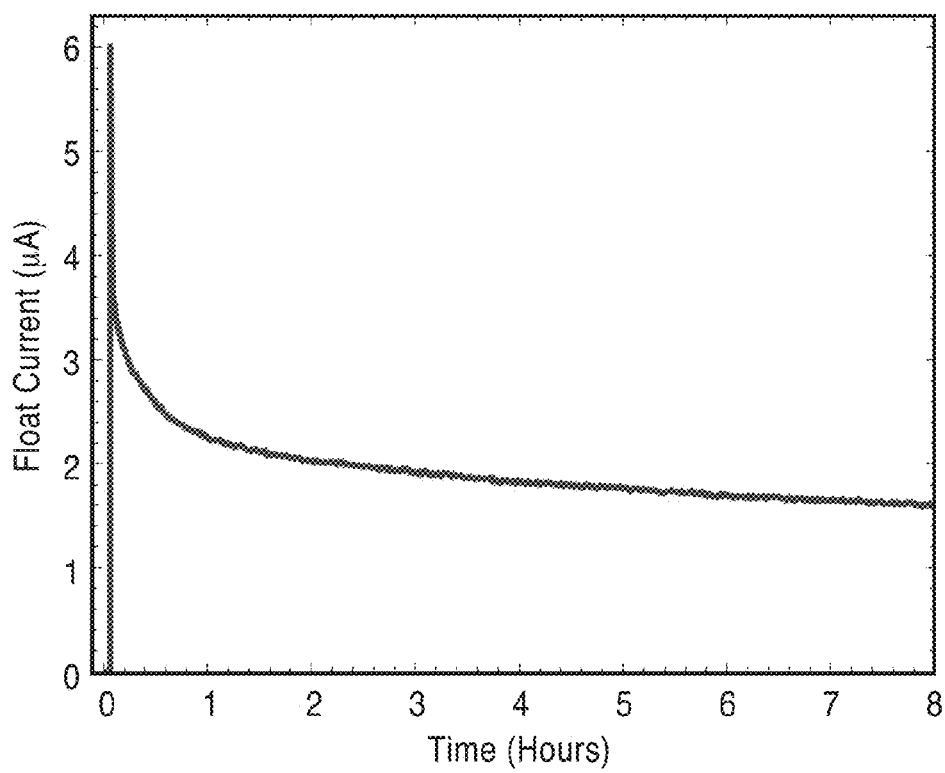

FIG. 30 shows the current response to potentiostatic control of a printed battery. The float current is assumed to be the steady state current achieved after holding the cell at a certain potential for extended times.

Figure 31:
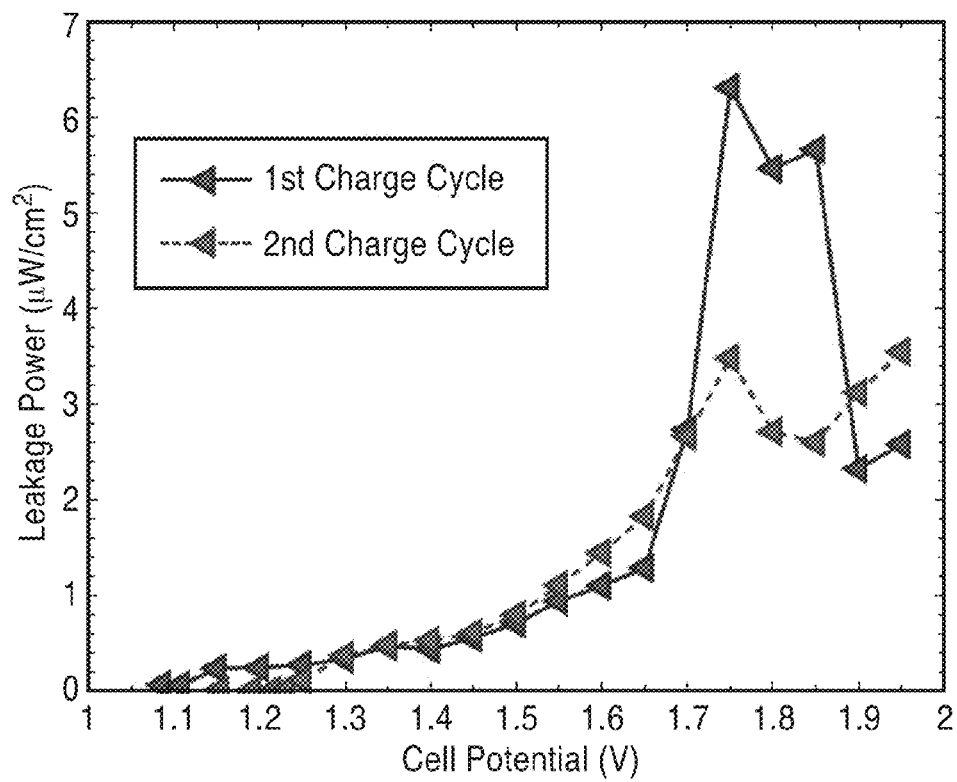

FIG. 31 is a plot of the charge passed due to leakage for two charge cycles as a function of cell potential.

Figure 32:
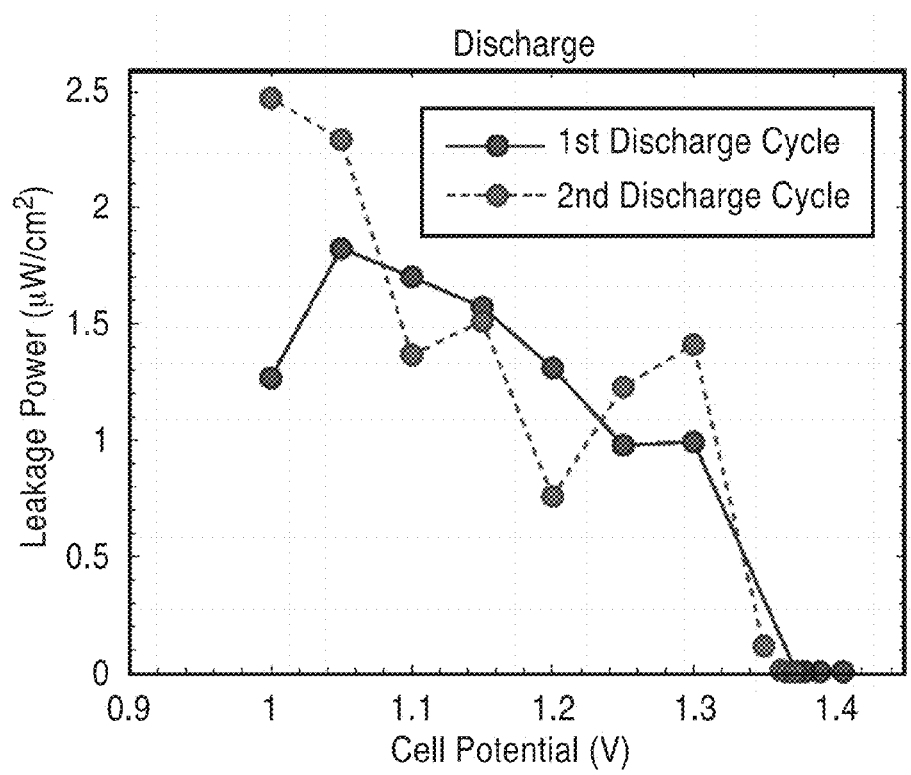

FIG. 32 is a plot of the charge passed due to leakage for two discharge cycles as a function of cell potential.

Figure 33:
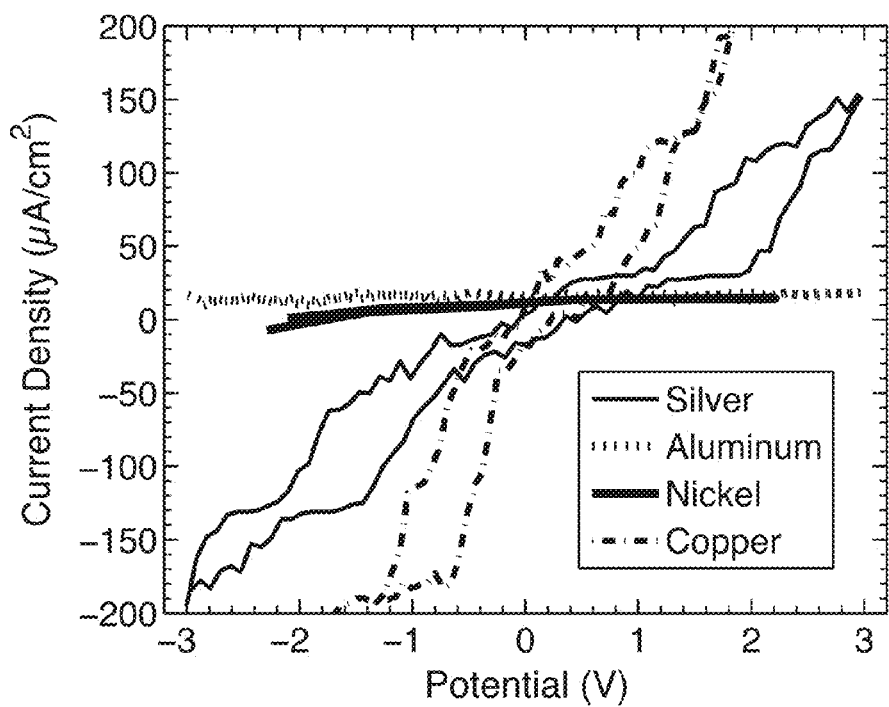

FIG. 33 shows voltammograms of symmetric cells containing two adjacently printed silver, nickel and aluminum current collector films, each covered in a printed gel electrolyte. The electrochemical instabilities of silver, nickel and aluminum in the gel electrolyte correspond with the magnitude of current density detected for a given potential.

Figure 34:
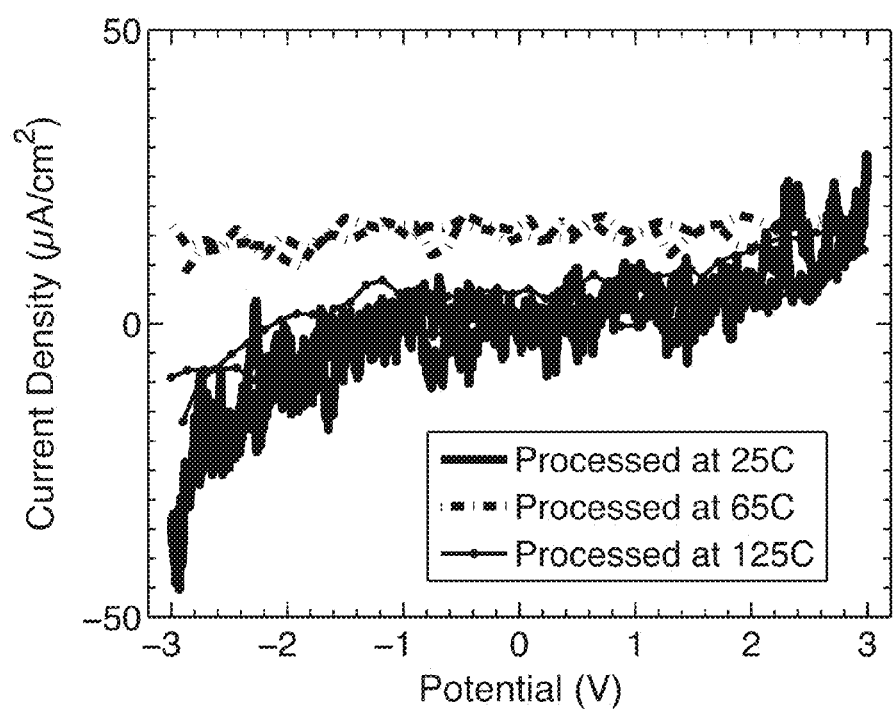

FIG. 34 shows voltammograms showing stability at various temperatures (25° C., 65° C., and 125° C.) of a cell containing two adjacently printed aluminum foil current collector, each covered in a printed gel electrolyte in accordance with the present invention.

Figure 35A:
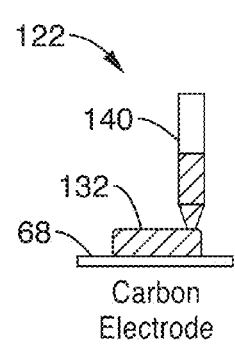
Figure 35B:
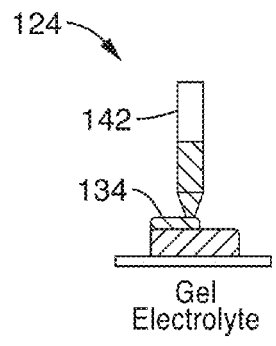
Figure 35C:
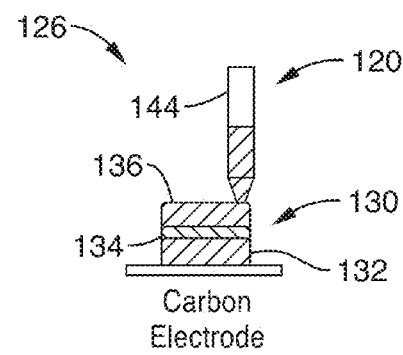

FIGS. 35A through 35C show a schematic of printing process for electrochemical capacitor.

Figure 36:
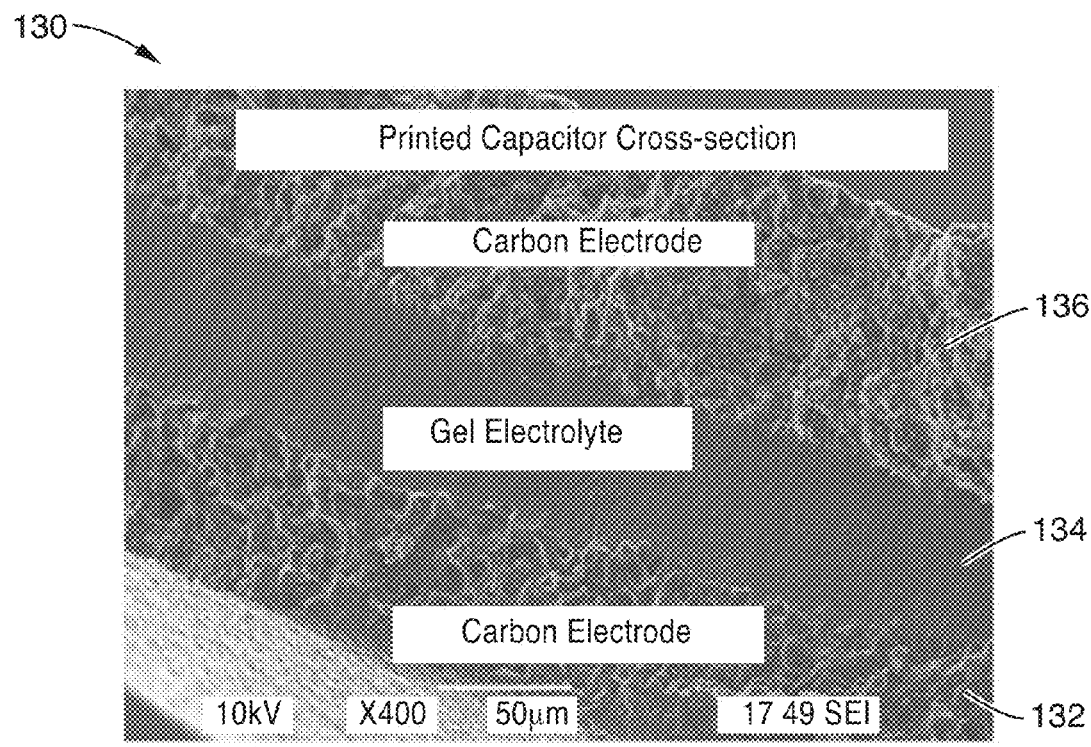

FIG. 36 is a micrograph of a fabricated electrochemical capacitor cross section.

Figure 37:
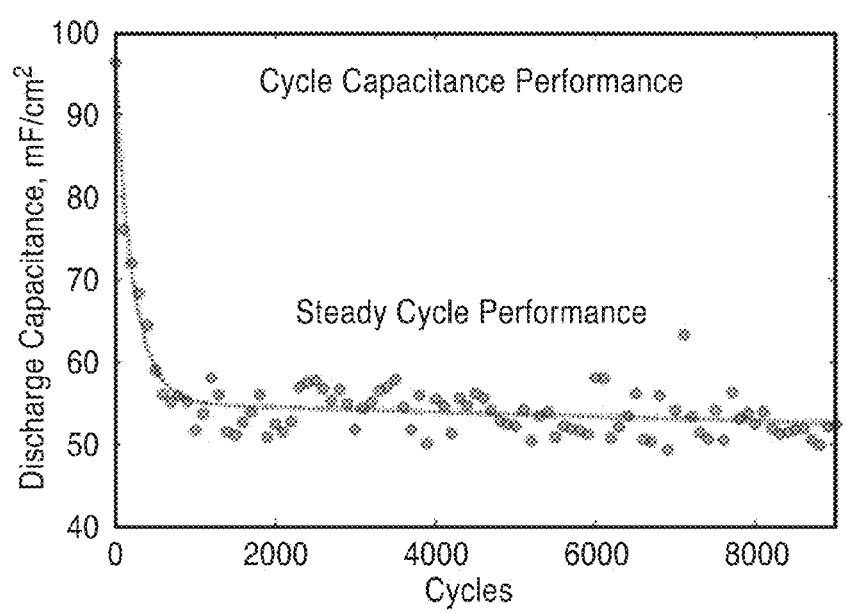

FIG. 37 is a plot of cycle life vs. capacitance of the printed electrochemical capacitor of FIG. 36

Figure 38:
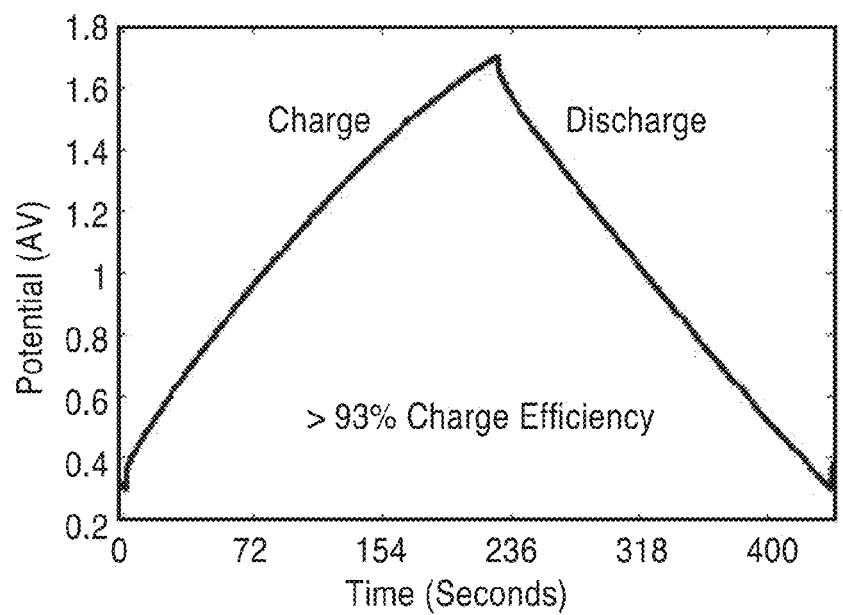

FIG. 38 is a plot of the charge and discharge cycle of the printed electrochemical capacitor of FIG. 36.

Figure 39:
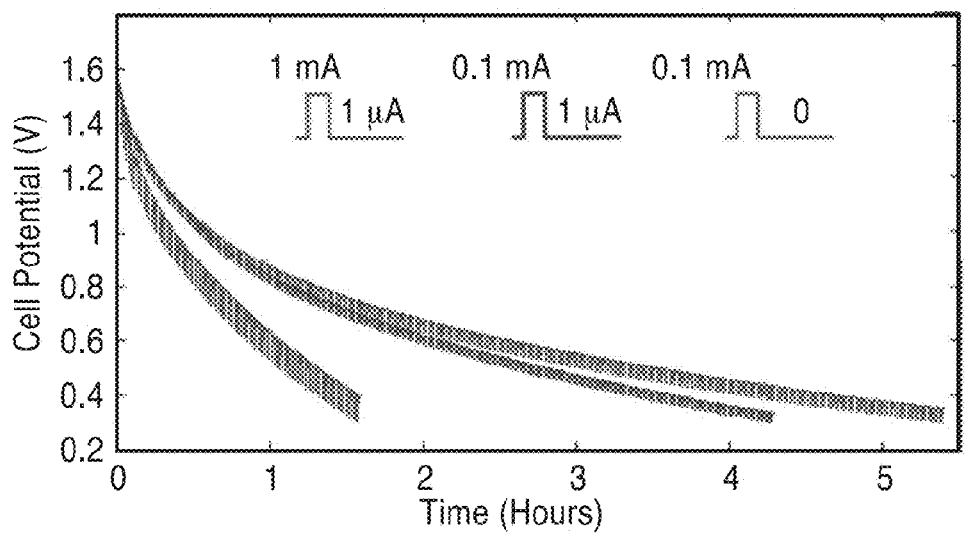

FIG. 39 illustrates the pulsed behavior of the printed capacitor at 1 mA, and 0.1 mA.

Figure 40:
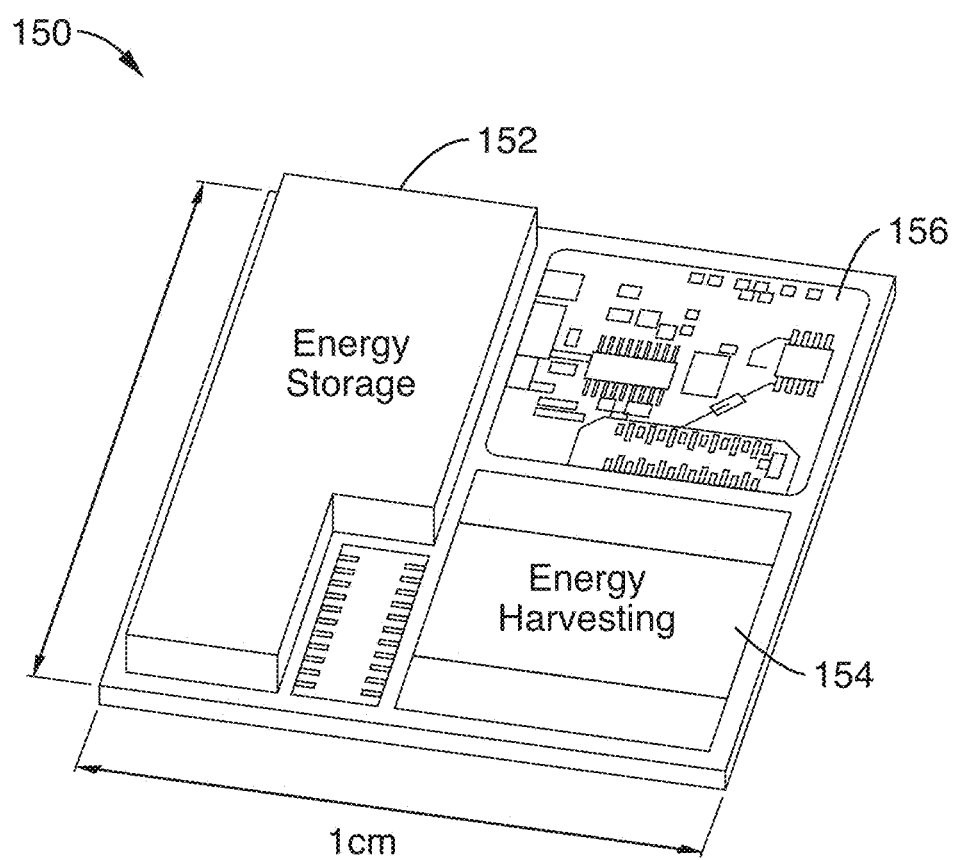

FIG. 40 illustrates an exemplary RFID chip incorporating the printed microbattery of the present invention.

Figure 41:
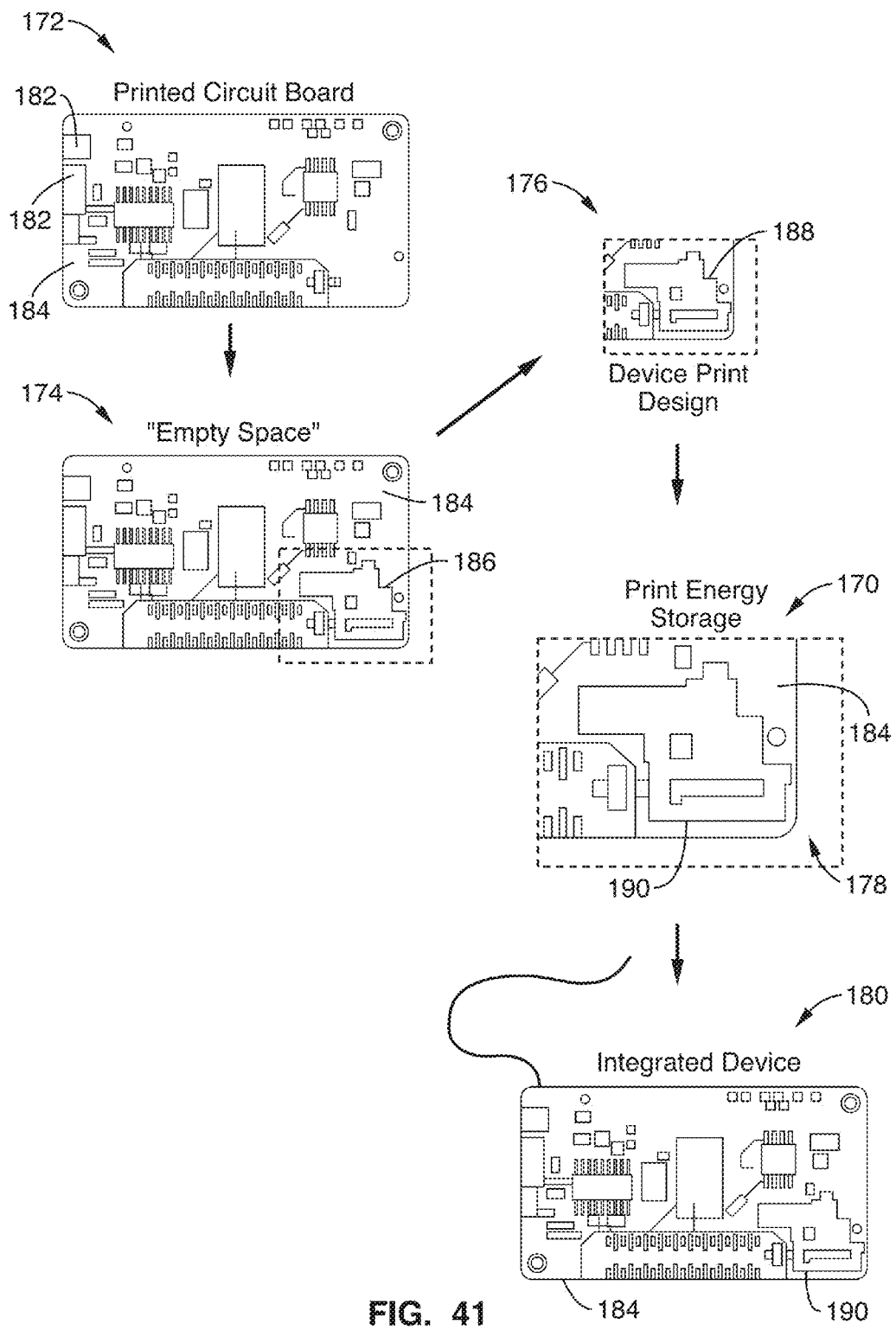

FIG. 41 illustrates a schematic diagram for a method of generating a integrated circuit with a print-on-green battery in accordance with the present invention.

DETAILED DESCRIPTION OF THE INVENTION

The preferred embodiments are illustrated in the context of a printable zinc electrochemical cell in which divalent ions travel through a gel electrolyte. The skilled artisan will readily appreciate, however, that the materials and methods disclosed herein will have application in a number of other contexts where divalent ion transport is desirable, particularly where simple and low-cost manufacturing is important.

In this disclosure, the terms "negative electrode" and "anode" are both used to mean "anode." Likewise, the terms "positive electrode" and "cathode" are both used to mean "cathode."

Room temperature "Ionic liquids" are defined as a class of liquids that are organic salts with low melting points (below 100° C.). Ionic liquids have properties that include high ionic conductivity, very good electrochemical and temperature stability, and negligible vapor pressure. These enhanced properties and environmental benefits have attracted diverse attention to room temperature ionic liquids as potential replacements of volatile solvents and materials in manufacturing, chemical reactions, separation, and electrolytes, to name a few. When ionic liquids are incorporated into polymer gels, they can form electrolytes that have liquid-like ion transport properties a few orders of magnitude greater than other polymeric or solid-state electrolyte systems. Such ionic liquid gel electrolytes can also be structurally robust and can maintain physical separation between the electrodes of an electrochemical cell even under compression. Furthermore, in ambient environments and room temperature conditions, the gel does not dry out or "sweat" as the ionic liquids are negligibly volatile.

"Multivalent" is herein defined as an atomic or molecular species carrying more than one full charge.

"Non-aqueous" is herein defined as a system that is largely free of the presence of water, except in trace amounts as a residual contaminant.

Note that the power behavior of a battery can also be characterized by its rate performance, and is evaluated by the time (in hours) it takes to deplete a device of its maximum storage capacity (C). Note that this terminology can be confusing, as C is also used to represent Coulombs and should not be confused when referred to as a rate of charge or discharge. For example a battery that took 10 hours to completely drain was discharged at a C/10 rate, while a quick discharge of 2C means the battery was depleted in a half hour.

1. Electromechanical Cell

Figure 1:
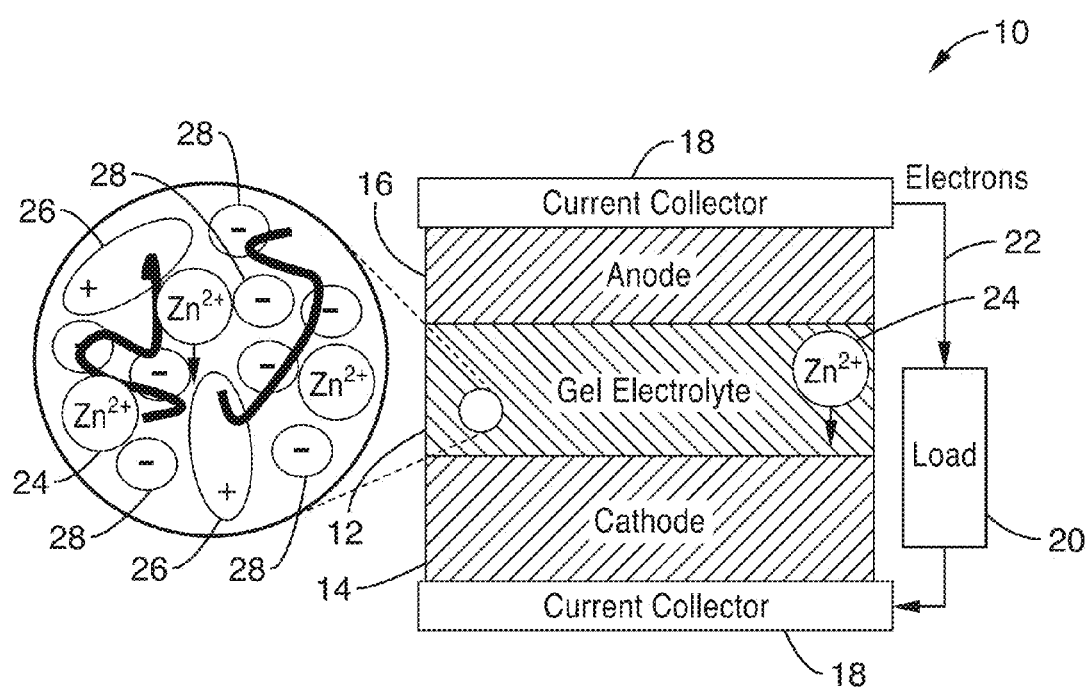
FIG. 1 is a schematic diagram of a printed power source in accordance with the present invention.

FIG. 1 is a schematic cross-section of an electrochemical cell 10 according to an embodiment of the invention. The cell 10 comprises a cathode 14 and anode 16 separated by a electrolyte layer 12. As shown in FIG. 1, current collectors 18 may be positioned at the open sides of the anode 16 and cathode 14 to provide proper electrical contact with load 20. It is appreciated that the current collectors 18 are an optional component, and the cell 10 may comprise other configurations with or without current collectors 18.

As shown in FIG. 1 the electrochemical cell 10 can be attached to a circuit 22 to do work on an outside load 20. In one arrangement, the electrochemical cell 10 is a battery cell. In another arrangement, the electrochemical cell 10 is a rechargeable battery cell. In yet another arrangement, the electrochemical cell 10 may comprise a capacitor.

Figure 2:
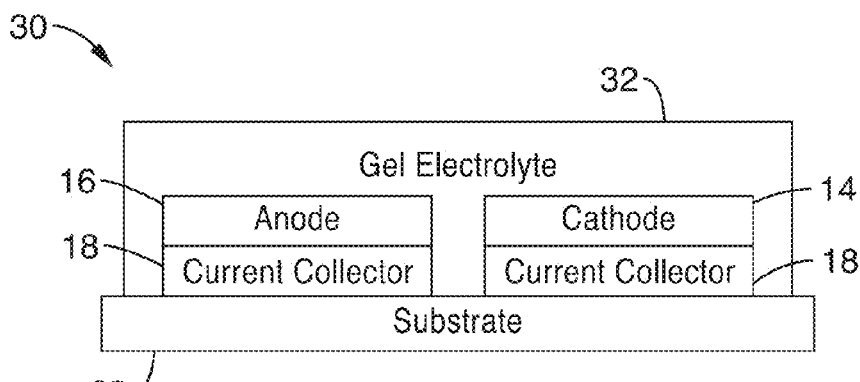
FIG. 2 shows a schematic diagram of alternative 2-D planar cell configuration in accordance with the present invention.

It is appreciated that the electrochemical cell 10 may be fabricated using any of the fabrication methods described below to comprise a number of different structural arrangements. For example, the electrodes may be oriented in a stacked configuration as shown in FIG. 1, or may comprise a 2-dimensional planar configuration as shown in the cell 30 of FIG. 2. In FIG. 2, cell 30 comprises an anode 16 positioned adjacent cathode 14 on substrate 68. Current collectors 18 may be use to provide electrical contact between the anode 16, cathode 14, and the substrate. In this configuration the gel electrolyte 32 encapsulates, and provides separation between, the anode 26 and cathode 14. It is appreciated that the device 10 of FIG. 1 may also be disposed over a substrate 68 as shown in FIG. 2.

Figure 3:
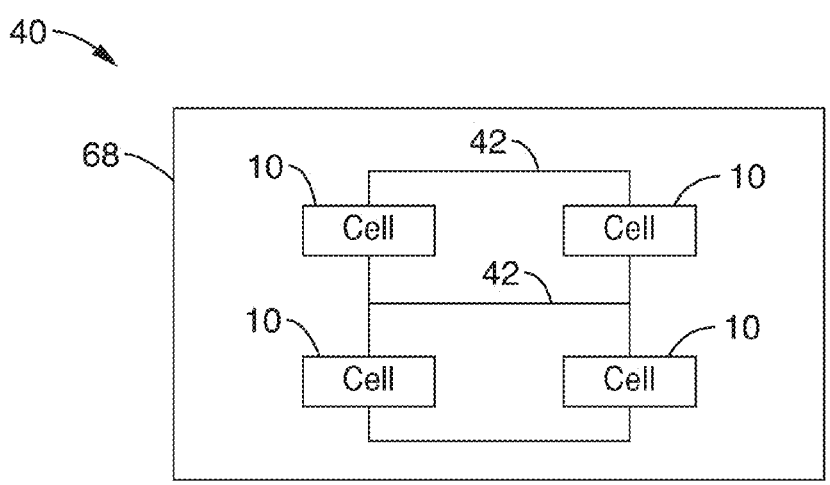
FIG. 3 is a schematic diagram of a device incorporating an array of cells in accordance with the present invention.

Referring now to FIG. 3, a device 40 may comprise a custom connection of an array of batteries 10 coupled to achieve tailored voltage, capacity, energy density, power density output.

The individual cells may be patterned as stacked sandwich (each cell 10 patterned one on top of other, not shown), or the cells 10 can be patterned in an open adjacent sandwich configuration where electrodes are adjacent to each other as shown in FIG. 3.

Positive and negative leads of each battery are accessible on a substrate surface and can be connected via connectors 42, which may comprise a conductive ink. In one embodiment, the conductive ink 42 may be deposited using a variety of deposition methods, as will be further detailed below, such as ink jet printing, screen printing, flexographic printing, slot die coating, or the like.

As an alternative to a conductive ink, the connections 42 may be made via a foil connection (e.g. aluminum, stainless steel, nickel foil, etc.) using foil die cutting, cold foil or hot foil printing methods.

In further alternative embodiments, connections 42 may be fabricated via elastomeric connectors (ZEBRA, ACF tape), or via clamp connections, probe connections, wire bonding, etc.

Cells 10 may be connected so all cells are connected in series (positive leads of one cell are connected to negative leads of other cells) to get multipliers of cell voltages (i.e. one cell is 1.5V, two cells is 3V).

Cells 10 may be connected so all cells are connected in parallel (positive leads of one cell are connected to positive leads of other cell) to get multipliers of cell capacity (i.e. One cell has 5 mAh, two cells output 10 mAh). Mixed configurations of series and parallel connections may also be made to get custom voltage and capacity output.

The sizes of each cell 10 may can vary, e.g. from dots ranging from 1 to 5000 μm diameters, to modules from 0.25 to 500 cm², to large sheets from 0.05 to 1,000 m².

Stacking of cells (not shown) may also be used to achieve custom voltage and parallel configurations. For series connection, cells may be stacked one on top of other by placing positive panel of one battery in contact with the negative panel of another battery. For parallel connection, stacked cells may be separated by an insulator layer and an external bus line can be used to connect positive terminals of cells (e.g. run down the side of battery).

The gel electrolyte 12, 32 may be used as both a separator and structural material (e.g. thickness/composition may be varied to provide additional structural integrity, or may be used to encapsulate cell as shown in FIG. 2). The structural gel layer 12 may also be used to create non planar form factor batteries, e.g. the gel electrolyte may be structured to build up walls in which a trench is formed and back fill trench with other materials, such as an electrode.

In a preferred embodiment of the invention, the electrolyte layer 12, 32 is a gel electrolyte as shown in the close-up view of electrolyte layer in FIG. 1. The gel electrolyte 12 contains salt cations 24, (Zn2+), and salt anions and ionic liquid anions 28, the ionic liquid cations 26, which are imbibed in a polymer (dark lines). The gel electrolyte has a polymer network into which an ionic electrolyte liquid has been imbibed. In one arrangement, the polymer in the network is poly(vinylidene fluoride-hexafluoropropylene) (PVDF-HFP), PVDF and associated other copolymers, PVA, PEO etc. Exemplary liquid electrolytes include a class of materials known as ionic liquids. One exemplary ionic liquid comprises 1-butyl-3-methylimidazolium trifluoromethanesulfonate $[C_9H_{15}F_3N_2O_3S]$. An electrolyte salt appropriate for the divalent or multivalent ions that are to be transported through the electrolyte gel is dissolved in the ionic liquid. In one arrangement, the salt is a zinc salt such as zinc trifluoromethanesulfonate $[Zn(CF_3SO_3)_2]$, also known as zinc triflate or zinc bis(trifluoromethanesulfonate). The salt may also comprise other metals having multivalent ions, such as aluminum, magnesium, yttrium, or combination of the above.

The ionic liquids suitable for electrochemistry have low electrical conductivity (<5 mS/cm), large electrochemical stability windows (>1 V), ability to dissolve salts, and viscosities compatible with desired processing methods, and may comprise cations such as imidazolium variants, pyrrolidinium variants, ammonium variants, pyridinium variants, piperidinium variants, phosphonium variants, and sulfonium variants, and anions such as chlorides, tetrafluoroborate ($BF_4^-$), trifluoroacetate ($CF_3CO_2^-$), trifluoromethansulfonate ($CF_3SO_3^-$), hexafluorophosphate ($PF_6^-$), bis(trifluoromethylsulfonyl)amide ($NTf_2^-$), bis(fluorosulfonyl)imide ($N(SO_2F)_2^-$). Further distinctions in electrochemical, conductivity, and viscosity properties can be tailored by the chain lengths of the cations.

In one embodiment, the liquid electrolyte has an ionic conductivity larger than 1 mS/cm, and preferably ranging between 2 mS/cm and 3.5 mS/cm, and more preferably between 2.3 mS/cm and 2.7 mS/cm.

In another embodiment, an ionic liquid gel electrolyte has an ionic conductivity larger than 0.01 mS/cm, or preferably ranging between 0.03 and 3.5 mS/cm, and more preferably between 0.3 mS/cm and 2.7 mS/cm.

In yet another embodiment, the liquid electrolyte has a zinc salt concentration between 0.2 and 0.75 M in ionic liquid, and preferably between 0.4 and 0.75 M, and more preferably between 0.45 and 0.65 M.

In another embodiment, a liquid electrolyte having a salt concentration between 0.3 to 0.75M has an ionic conductivity ranging between 2.3 mS/cm and 2.7 mS/cm.

In a further embodiment, a liquid electrolyte having a salt concentration between 0.4 to 0.75M has an ionic conductivity above 2.3 mS/cm.

The preferred zinc salt concentration in the ionic liquid can also be defined as the % of salt with respect to its solubility limit. The solubility limit of the zinc salt within the ionic liquid is defined as the concentration of salt added to the ionic liquid at which no more zinc salt can be dissolved. In one embodiment, the preferred zinc salt concentration is between 25% and 100% of its solubility limit, and preferably between 50% and 95% of its solubility limit, and more preferably between 60% and 88% of its solubility limit.

Furthermore, the ionic liquid electrolyte concentration in the polymer gel can be defined as % weight of ionic liquid electrolyte in the polymer gel. In one embodiment, the preferred % weight of ionic liquid electrolyte to polymer is greater than 20%, and preferably ranging between 25% and 90%, and more preferably between 40 and 85%.

The gel electrolyte layer 12 acts as a physical and electronic separator between the anode 16 and the cathode 14. Despite having mechanical properties similar to a solid material, the gel electrolyte 12 has ion transport properties very similar to a liquid electrolyte.

The ionic liquid gel electrolytes of the present invention have reduced flammability and less hazardous in comparison to typical organic and corrosive electrolytes, making them inherently safer than traditional electrolytes used in commercial systems, especially in conditions of puncture (from nails, bullets, and other sharp objects) ripping, cutting, and other physical damage. Additionally, ionic liquid gel electrolytes are unique in that ionic liquids have negligible vapor pressure and therefore do not evaporate or leak away even under prolonged use. By eliminating the problems of evaporation and leaking (also known as "sweating"), of the liquid component in the gel electrolyte, expensive and complicated hermetic packaging is not needed, thus simplifying processing and reducing the cost of the battery system immensely.

In a preferred embodiment of the invention, the anode 16 comprises a metal which emits multivalent ions when undergoing an oxidation reaction with the ionic liquid electrolyte. For example zinc metal forms zinc ions of divalent charge as a result of an oxidation reaction with the ionic liquid electrolyte. The anode 16 may also comprise aluminum, magnesium, yttrium, or combination of metals that may include some or all of zinc, aluminum, and magnesium metals, or the like.

The anode material composition may also comprise of multiple morphological features (e.g. zinc flakes and spherical particles and nanoparticles) to increase electrochemical capacity.

In one embodiment of the invention, the cathode 14 has, as a major component, a metal oxide. For example, the cathode 14 may comprise vanadium pentoxide ($V_2O_5$), manganese dioxide ($MnO_2$) particles, cobalt oxide ($CoO_x$) particles, lead oxide ($PbO_x$) particles, or the like. In yet another embodiment of the invention, the cathode 14 has, as a significant component, particles of any metal oxide that can absorb and release ions that come from the anode.

In one arrangement, the cathode 14 also includes, as a component, a polymer binder, and optionally, electronically-conductive particles (e.g. high surface area carbons, activated carbons, or conductive nanoparticles), and optionally rheology-enhancing particles and polymers (e.g. titanium oxide powder and silica particles).

Cathode 14 composition may also be varied to utilize alternative morphological forms of the conductive additives (e.g. graphites and flakey conductive particles) to provide better electrode conductivity and electrochemical properties for thick films >15 μm.

It is appreciated that for optimal cell performance, the cathode 14 materials be matched with appropriate anode 16 materials. It is important that the cathode 14 contains, as a significant component, materials that can transfer and transmit ions that come from the anode through a combination of oxidation and reduction reactions. For example, the oxidation and reduction reactions for a cell 10 as shown in FIG. 1 occur as provided in Equations 1 and 2 below:

$$Zn \leftrightarrow Zn^{2+} + 2e^-$$   Eqn. 1

$$2e^- + (2MnO_2^-)Zn^{2+} \leftrightarrow Zn^{2+} + 2MnO_2$$   Eqn. 2

It is also important that the thermodynamic pairing of the anode and cathode materials form a desired electrochemical potential, manifested in a measured cell voltage. For example, a zinc anode 16 may be coupled with a $MnO_2$ cathode, and the typical cell voltage ranges between 1.1-1.6 V.

As shown in FIG. 1 current collectors 18 are positioned adjacent to, and in electronic communication with the cathode 14 and anode 16. Examples of useful current collectors 18 include, but are not limited to, stainless steel, zinc, gold, aluminum, and nickel.

For example, aluminum as a current collector 18 material was tested to have electrochemical stability over −3 to 3V range when in contact with the gel electrolyte of the present invention. Actual batteries using aluminum foil as current collectors have been demonstrated. Similarly, batteries using nickel and stainless steel foils have also been demonstrated separately as current collectors.

In addition, different forms of aluminum and nickel current collectors are contemplated, e.g. foils, nanoparticle ink, composite slurry, electrodeposited coating, and vapor deposited metal.

Cold foil printing, hot foil printing, or kiss-cut die cutting (processes generally used extensively in the printing, lamination, and tape conversion industry) may also be used to pattern metal foil conductive traces on substrates (such as paper, plastic, fabric). These processes are highly scalable, cost-effective, and high throughput methods for patterning metal foils on non-conductive substrates or backings.

Foil current collectors 18 would preferably be used 1) in situations where high amounts of bending and creasing and ruggedness are desired, 2) if paper/plastic/fabric substrates are used to eliminate an ink printing step, or 3) low cost applications.

There are many possible kinds of substrates 68 that can be used to support printing of the electrochemical cell. Examples of possible substrates include, but are not limited to, paper (e.g. cardstock or different types/weaves/thicknesses of paper), polymeric or plastic materials (e.g. polyethylene tetrephthalate or polyester (PET), polyethylene, polypropylene, Kapton, polyimide, polyester ether ketone (PEEK), polyurethane, polydimethysiloxane or other silicone resins), fabric of various weaves and meshes (e.g. nylon, cotton, denim) silicon, printed circuit board (e.g. cured epoxy resin substrates, FR4, and flexible circuit boards), glass, metal foil, or combination thereof (e.g. fabric with plastic backing). In one arrangement, the substrate is a material that can be folded into any shape as required for the application. In one arrangement, a device such as a microprocessor or a MEMS device can be used as the substrate 68. Any of the substrates mentioned above may also have an adhesive backing that will allow for integration of battery onto a surface.

The substrate 68 and electrode layers are preferably configured to withstand bending and levels of curvature from increasing to large curvature radii (e.g. wrist watch curvatures, and curvatures experienced in rolling processes).

The gel electrolyte 12 may also comprise of component compositions configured to withstand environmental levels of stability. For example, cell 10, may withstand high temperatures, e.g. up to 150° C. for extended exposure (without polymer degradation), and even higher temps (like solder temperatures, e.g. 200° C. to 300° C.) for very short amounts of time (several seconds). Cell 10, 30 may withstand low temperatures, e.g. down to −20° C. for consumer electronics and down to −40° C. for industrial applications, and low and high humidity.

Additional packaging (not shown) may also be provided with encapsulation types and methods, such as: dip coating in polymers and/or elastomers such as silicone, single sided printing of encapsulation ink material, double sided printing of encapsulation ink material, hot lamination (the cell 10 of the present invention was tested to withstand the high pressure and temperature associated with this process), polymer lamination with an adhesive, metal foil pouches hot pressed at edges, hard packages, e.g. metal cases, and conventional battery packages.

One or more of the various cell 10 layers (e.g. gel electrolyte 12, electrodes 14, 16, current collectors 18) may be formulated into an ink for fabricating an electrochemical cell by printing at least some of the layers. Desirable materials can be mixed together to form, for example, solutions, suspensions, melts, or slurries, which can be used as "ink" in the printing process.

Various deposition methods may be employed, e.g. direct write printing, screen printing (e.g. Atma, M&R, Colt), flexographic printing (Dai's Machinery, Line O Matic), gravure printing, dispenser printing, ink jet printing (e.g. Fuji Dimatix), slot die coating.

FIG. 4 and FIGS. 5A through 5D illustrate a method of printing a microbattery using dispenser printing in accordance with the present invention. It is appreciated that other printing/deposition methods may also be used, and that the direct write dispensing method of FIGS. 4 and 5A through 5D are illustrated for exemplary purposes only.

Direct write dispenser printing comprises a method for additively depositing a variety of materials, including slurries, solutions, and suspensions, generally referred to as "inks." Direct write dispenser printing is a flow-based method of direct write patterning with the ability to deposit inks at room temperature and ambient conditions, all the while generating negligible materials waste and requiring minimal environmental overhead. In comparison to conventional microfabrication techniques, which utilize subtractive processes such as lithography and etching, the number of process steps, energy demanded, and waste generated is significantly less.

Figure 6:
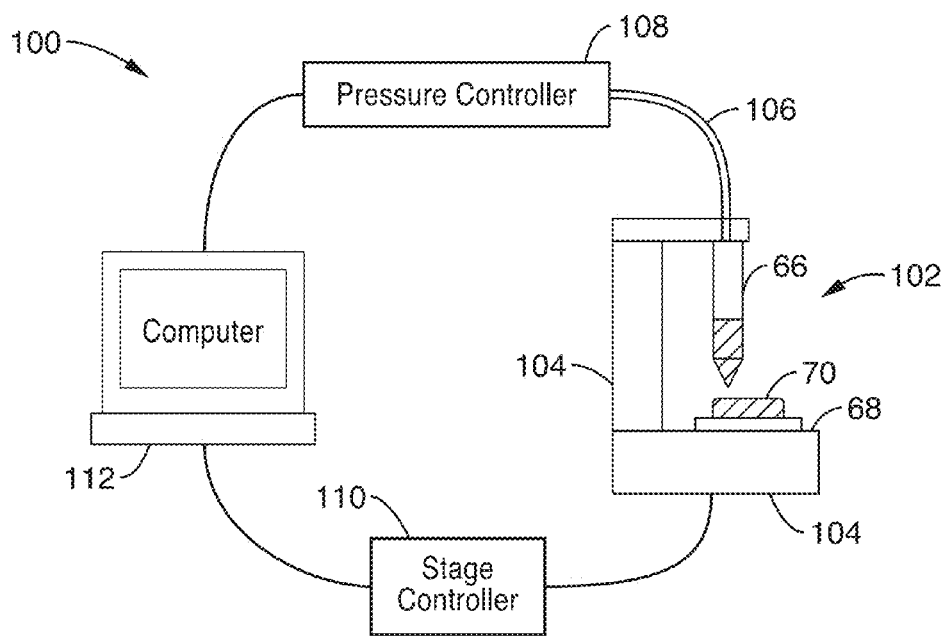
FIG. 6 is a schematic diagram of a dispenser printer configured for generating a printed microbattery in accordance with the present invention.

The material compositions of the present invention may be printed on to various surfaces using the dispenser printer system 100 and printer 102 shown in FIG. 6. The ink is loaded into a syringe 66, extruded through a hollow needle of predetermined dimensions, and written onto a substrate 68 via a succession of drops, or "shots." The drop size is determined by the needle's dimensions, ink rheology, and applied pressure. The resulting printed film 70 morphology depends on the dimensions of the extruded drops as well as the traversing distance, speed, and time between shots. The motion of the three-axis stage 104 on which the syringe 66 and substrate 68 are mounted, along with the pressure applied from a pneumatic controller 108, generates the dimensions and shapes of the deposited films.

Pneumatic pressure is applied using a controller 110 (e.g. Musashi ML-808FX) that is capable of 2-50 kPa output. Disposable syringe needles 66 of 16-30 Ga (0.15 to 1.35 mm inner diameter) are used to print the inks; tips with inner diameters as small as 0.05 mm can be fabricated by pulling capillary glass tubes using a glass pipette puller. A variety of tips with different needle sizes may be used according to the composition of the layer being deposed and the desired layer dimensions. As a general rule, the smallest diameter needle that a slurry can be consistently printed through must be at least an order of magnitude larger than its largest particles. Depending on the ink, preparation may include a combination of ball milling the particles, physical mixing (magnetic stirrers, paint shakers, vibrating surfaces) and ultrasonic mixing (with a water bath or wand).

With the assortment of needle sizes and wide span of pneumatic pressures that can be applied, the dispenser printer is able to process a variety of inks into a range of printed feature sizes. All the equipment is controlled and automated through computer 12 and software implemented on a personal computer.

Figure 4:
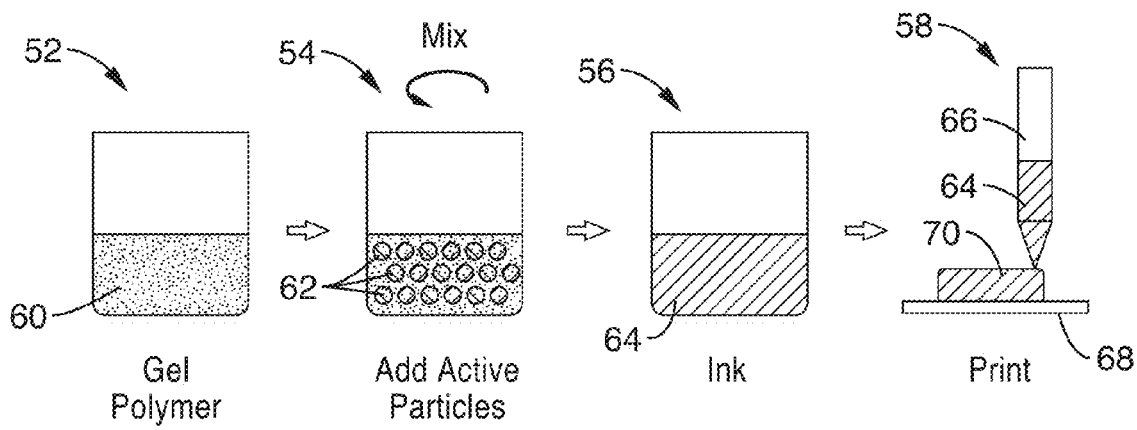
FIG. 4 is schematic diagram of a method for of ink synthesis for dispenser printing in accordance with the present invention.

FIG. 4 illustrates ink preparation process in accordance with the present invention. At step 52 a gel polymer network is provided. In one arrangement, the polymer in the network is poly(vinylidene fluoride-hexafluoropropylene) (PVDF-HFP). At step 54 the active particles 62 are mixed with the gel polymer 60 to create the ink 64. The active particles may vary according to the desired layer that is being printed (e.g. gel electrolyte 12, anode 16, cathode 14 or current collector 18 (if printed). Various solvents may also be added to change the rheology of the ink or change the working time of the ink so it is more compatible with different printing processes, for example, n-methyl-2-pyrrolidone (NMP), Dimethyl Sulfoxide (DMSO), 2-Pyrrolidone, N-ethyl-2-pyrrolidone (NEP), Dimethyl Formamide (DMF), or Acetone. The solvent or "vehicle" is later evaporated from the film.

The ink 64 is then placed in a syringe needle 66 at step 58 to print the desired layer 70.

FIGS. 5A through 5D show an exemplary method for fabricating a printed cell in accordance with the present invention. At step 82 shown in FIG. 5A, a substrate 68 (e.g. Nickel) is provided. Optionally, where a first current collector is used, a current collector (not shown) may be printed onto the substrate. In other arrangements, no first current collector is used, and at step 84 the first electrode layer 14 (e.g. $MnO_2$ cathode) is printed directly onto the substrate 68. Electrode layer 14 is printed onto the substrate 68 as a first ink dispenser 90 passes over the substrate 68. Where a current collector is used, the first electrode layer 14 is deposited on top of that layer.

Figure 5A:
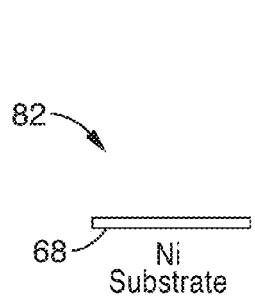
FIGS. 5A through 5D show schematic diagrams for a method of generating a printed battery in accordance with the present invention.
Figure 5B:
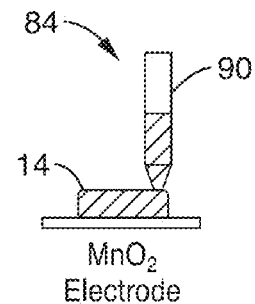
Figure 5C:
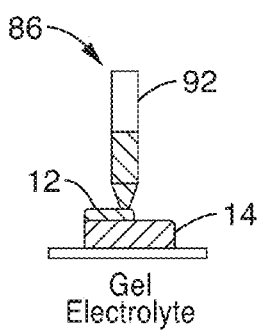

At step 86 shown in FIG. 5C, a gel layer 12 is printed onto the first electrode layer 14 as a second ink dispenser 86 passes over the first electrode layer 12. In one arrangement, the electrolyte 12 is a gel electrolyte, preferably comprising ionic liquids mixed with a polymer network into which the electrolyte liquid has been imbibed. An electrolyte salt appropriate for the divalent/multivalent ions that are to be transported through the electrolyte is dissolved in the ionic liquid.

Figure 5D:
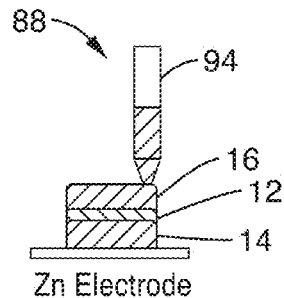

At step 88 shown in FIG. 5D, a second electrode layer 16 (e.g. zinc anode) is printed onto the electrolyte layer 12 as a third ink dispenser 94 passes over the electrolyte layer 12. It is appreciated that the first electrode layer 14 can be either a positive electrode or a negative electrode, and the second electrode layer 16 is the opposite type from the first electrode 14. That is, if the first electrode 14 is a positive electrode, then the second electrode 16 is a negative electrode, and vice versa. Materials for positive electrodes and negative electrodes have been discussed above.

In one arrangement, printable materials for electrodes are slurries of active electrode material particles mixed with a polymer binder(s), a removable solvent, and optional additives. In one embodiment of the invention cathode chemistries may comprise a metal oxide such as vanadium pentoxide particles or manganese dioxide particles or both kinds of particles as the active cathode material particles. In one embodiment, the anode chemistries have zinc particles as the active anode material particles.

It is appreciated that not all layers of the electrochemical cell 10 are necessarily printed layers. It is possible to replace one or more printed layers with pre-formed films. In an exemplary embodiment, a zinc foil is used for the negative electrode layer instead of printing the layer with a slurry that contains zinc particles. Additionally, the current collectors may comprise a cold or hot foil printed aluminum foil or vapor deposited metal traces. It is also contemplated that the layers may use other deposition methods, such as coating, etc.

After each layer has been deposited in the desired electrochemical cell structure, the layer can be dried. Each subsequent layer is deposited in the desired arrangement and then dried. The drying process removes the solvents that may be components of the slurries used in one or more layers, thus leaving a layer that is a solid, layered film. After all layers are arranged, the entire electrochemical cell structure may be dried to remove any residual evaporative solvents. In one arrangement, a layer or the cell structure is dried at room temperature for about 1-15 minutes and then at 60°-90° C. for about 3-30 minutes. In another arrangement, a layer or the cell structure is dried using a vacuum oven. In yet another arrangement, a layer or the cell structure is dried using an infrared or heat lamp.

In one arrangement, the substrate 68 can be removed after the electrochemical cell has been fabricated.

In comparison to currently-available, thin-film batteries, the printable zinc electrochemical cell 10 of the present invention offers several unique advantages. One important advantage is that the printing materials and methods for fabricating electrochemical cells, as described above, can be performed at room temperature and under ambient conditions. That is, no special vacuum or forming gas atmosphere is used to fabricate the cells. Thin film battery vapor deposition technology requires a high temperature (>400° C.) annealing step to form crystalline phases of the thin-film deposited electrodes. Such ambient conditions make it possible to consider manufacturing, materials, and process options that have not been possible before. For example, temperature-sensitive substrates such as polymer films or paper can be used as there is no high-temperature annealing step in the process.

Current thin film battery vapor deposition technologies often have problems with building thick electrode films due to high stresses that develop in films during thin-film processing. Thus, the thicknesses of such electrode films can be no more than a few microns, severely limiting the energy storage capacity with respect to the footprint area of the battery. In contrast, the printable electrochemical cells 10 of the present invention can be printed with much thicker electrodes—at least one to two orders of magnitude thicker than thin film microbatteries—and therefore can achieve much higher areal energy densities.

Finally, nearly all thin film batteries, such as lithium or lithium-ion thin film vapor deposited batteries or zinc-based alkaline and acidic semi-printed batteries, are either extremely sensitive to moisture or utilize a liquid component, and therefore great efforts to seal the cells hermetically are needed. In comparison, the chemistry disclosed herein is physically solid state and much more environmentally stable. The gel electrolyte 12 is non-aqueous, and contains no corrosive components, and does not leak or dry out even after prolonged cell use. Thus the printed cells 10 can be used without the robust and expensive hermetic packaging that is required in typical commercial cells.

As an added benefit, no expensive vacuum equipment is needed to fabricate or process the battery. All in all, the processes and chemistries described herein are much simpler than standard sputter or vapor deposition or liquid handling thin film methods that are currently the industry standard. Such simplicity makes it possible to produce electrochemical cells with many more options and at a lower cost than has been possible before.

This rechargeable battery has a nominal voltage between 1.1-1.6V depending on the cathode electrode chemistry, and may be operated between 0.7-3 V.

2. Experimental Results

Generally, the study and use of ionic liquids in batteries predominantly has been focused on lithium and lithium-ion battery systems, and has largely disregarded its application to non-lithium battery chemistries, especially electrode pairs traditionally utilizing aqueous electrolytes such as zinc-carbon and zinc-manganese dioxide systems. Traditional alkaline and acidic zinc-based batteries undergo electrochemical reactions which require the presence of water, while lithium-based battery chemistries utilize non-aqueous, aprotic, organic electrolytes. Historically there have been minimal efforts to apply historically well-known organic liquid electrolytes used in commercial lithium and lithium-ion batteries (such as propylene carbonate, ethylene carbonate) to zinc-based battery systems. Therefore, as battery electrolyte materials research has shifted towards the study of ionic liquid electrolytes, this effort has concentrated on lithium-based chemistries and has been overlooked for zinc-based systems. To date, the transport properties and mechanisms of divalent or multivalent ions in ionic liquid solvents applied to battery systems are unknown and unutilized. Furthermore, the electrochemistry of zinc electrodes in combination with non-aqueous systems is less understood. In general, the relative size and charge of multivalent ions would be greater than monovalent ions (zinc ions are bigger than lithium and contain double the charge). As a result it would be expected that transport of zinc ions in the gel electrolyte would be significantly slower than in lithium systems, and the transport mechanisms more complex due to its dual charge. However, when measured, the transport of zinc ions in an ionic liquid electrolyte, specifically the ionic conductivity, was demonstrated to be as much as an order of magnitude greater than in an analogous lithium-ion ionic liquid electrolyte system. This suggests that because of its unique properties, the transport mechanisms within the gel electrolyte are different for zinc ions than with lithium ions. This was an unexpected result.

In an analogous lithium ion battery using a similar gel electrolyte material, when exposed to ambient air conditions, the battery was unable to function for more than 24 hours. Part of what was assumed to attribute to this was that the gel electrolyte is made of a constituent that is very hygroscopic, rapidly absorbing moisture from the environment. When a similar zinc battery was constructed with the gel electrolyte material, the battery was tested in the same ambient air conditions but was able to survive and perform without any signs of degradation over many months (estimated 3-4 months). This was also a surprising result.

The following examples provide details relating to composition, fabrication and performance characteristics of block copolymer electrolytes in accordance with the present invention. It should be understood the following is representative only, and that the invention is not limited by the detail set forth in these examples.

Figure 7:
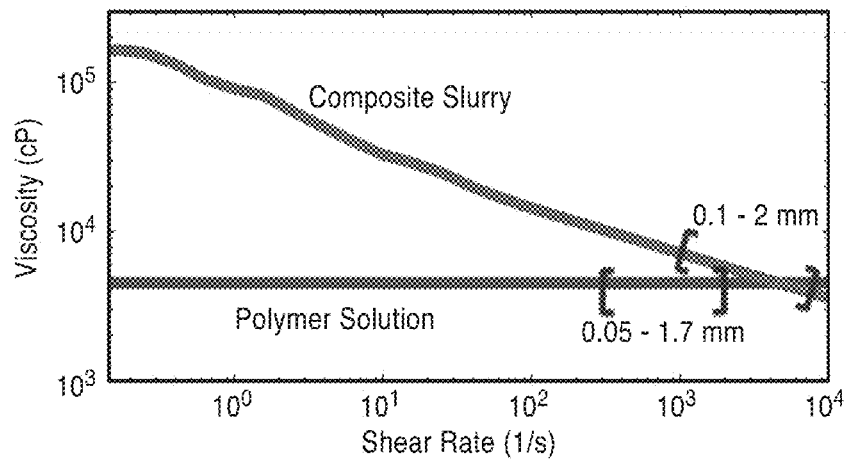
FIG. 7 shows viscosity with respect to applied shear rate for composite slurry and polymer solution inks. The ranges of shear rates and corresponding printed feature sizes applied by the dispenser printer are bracketed for both inks.

FIG. 7 illustrates the viscosity of a slurry having representative formula for a battery electrode and polymer solution as a response to shear rates applied to the inks. The polymer solution is composed of a representative formula for the gel electrolyte. The viscosities of the inks were measured with respect to varying shear rates applied by a Rheometric ARES rheometer [TA Instruments].

As shown in FIG. 7, the polymer solution displays a relatively constant viscosity for the shear rates applied, demonstrating Newtonian behavior (where the viscosity is insensitive to changes in shear rate). For shear rates greater than 0.2 1/s, the composite slurry ink viscosity decreases linearly with increasing shear rate on a log-log plot. The minimum and maximum shear rates applied to the ink by the printer are determined and then related to the corresponding dimensions of the printed feature. This was calculated by measuring the flow rate of ink through the smallest and largest syringe tips as a function of applied pressure.

In FIG. 7, the ranges of shear rates and corresponding printed feature sizes applied by the dispenser printer are bracketed for both inks. For example, for a dispenser shot time of 10 ms and the smallest pneumatic pressure of 20 kPa, the polymer electrolyte solution extruded from a 16 gauge needle was visually recorded with an orthogonally mounted camera, and then the drop volume was determined using image analysis software. The volume of ink was approximated as 1.18 $mm^3$, with the shear rate experienced by the ink under these conditions was 491.9 1/s, resulting in a dot pitch of 150 μm. This experiment was repeated for the smallest and largest gauge disposable needles available that could extrude the ink (between 16-30 gauge, respectively), and with the lowest and highest pneumatic pressures applied by the controller.

It is appreciated that the viscosity data shown in FIG. 7 are specific to dispenser printing processes. Viscosity may vary depending on the deposition process that is used, e.g. the desired viscosity would vary for screen printing or other processes.

Figure 8A:
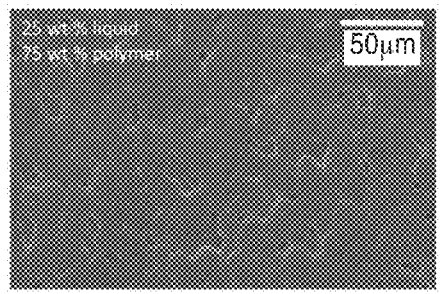
FIGS. 8A and 8B show micrographs of the ionic liquid/polymer in the gel electrolyte of the present invention.
Figure 8B:
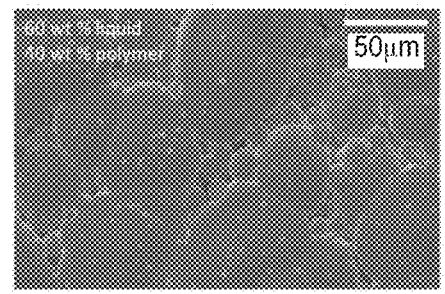

As seen in FIGS. 8A and 8B "grains" in the gel are observed to enlarge significantly in volume with the increased incorporation of a liquid (from 25 to 60 wt. % ionic liquid electrolyte). The gels of these compositions essentially act like flexible yet mechanically strong films, and can be compressed substantially without damage to the structure or oozing of the liquid phase. No visible "sweating" of the ionic liquid from the gel could be discerned even after extended use or shelf life. Exceeding 75 wt. % ionic liquid, the polymer is unable to accommodate the liquid, with a significant diminishment in the film's grain sizes and visible separation of the polymer and ionic liquid constituents.

The electrochemical and transport properties of an ionic liquid electrolyte and its compatibility with a zinc ion conducting battery were also investigated. 1-butyl-3-methylimidazolium trifluoromethanesulfonate (BMIM+Tf−) ionic liquid was used because of its availability, affordability, and its compatible anion with a zinc salt (zinc trifluoromethanesulfonate). However other ionic liquids and salt pairs may also be considered for this electrochemical system; for example, ionic liquids with reduced viscosities and more stable anions could be used for significant improvements in performance. The electrochemical properties of the BMIM+ Tf− ionic liquid with zinc salt concentrations varying between 0-0.75 M were compared. Note that beyond 0.75 M, the zinc salt was no longer completely soluble in the ionic liquid. In an analogous lithium electrolyte solution, the lithium salt lithium trifluoromethanesulfonate was soluble to approximately 1.4 M concentration in the same ionic liquid.

Figure 9:
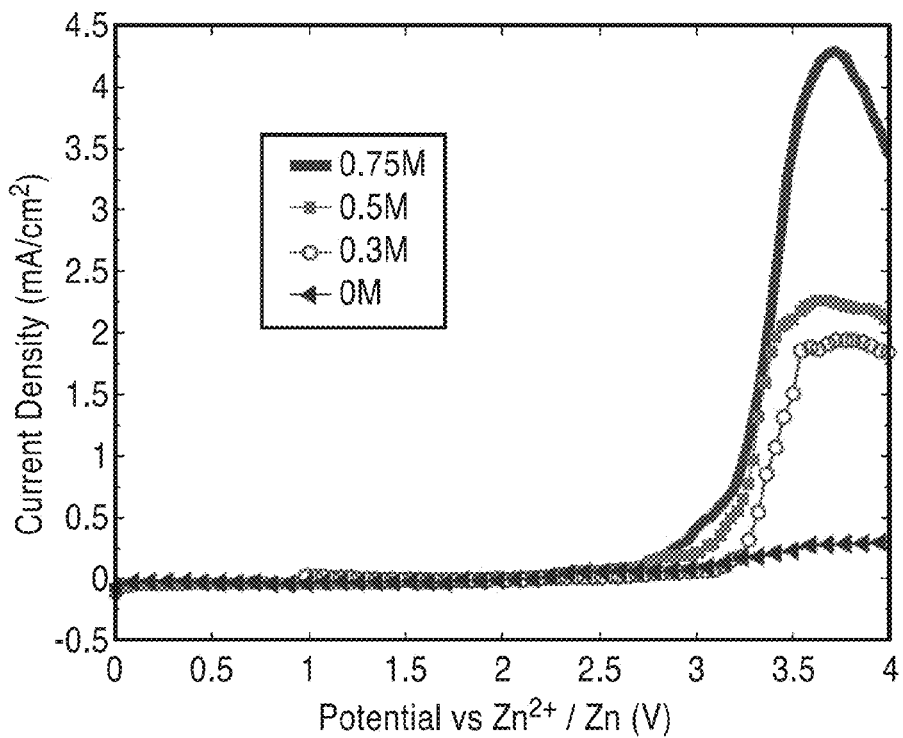
FIG. 9 illustrates the electrochemical potential stability of ionic liquid electrolytes with 0 to 0.75 M zinc salt concentrations. The occurrence of a large magnitude current density corresponds to electrolyte decomposition.

An electrolyte is only effective if it is stable within the operating electrochemical potential range of a device. Linear sweep voltammetry (LSV) experiments were performed on each of the ionic liquid electrolytes to determine its potential range of electrochemical stability. By applying a sweeping voltage at a rate of 5 mV/s to cells containing the ionic liquid electrolytes between zinc and a stainless steel blocking electrode, the anodic stability of the electrolytes was determined by monitoring the resulting current density (FIG. 9). With respect to the zinc electrode, all concentrations showed negligible current densities between 0 and 2.7 V, and therefore all electrolytes can provide the requisite electrochemical stability for a battery operating between the device voltages of 1-2 V. The measured current densities of the cells above 2.7 V rose accordingly with the increased zinc salt concentrations of the electrolyte; for the ionic liquids incorporating zinc salt, the current densities exceeded 1 mA/cm$^2$.

Ionic conductivity and viscosity comparisons of the ionic conductivity and viscosity properties of the ionic liquid electrolytes with zinc salt concentrations between 0-0.75 M were measured. The viscosities of the ionic liquids were measured with a Brookfield DV-III+ with a small sample, small volume adapter. Ionic conductivity properties were extracted via electrochemical impedance spectroscopy (EIS) measurements of symmetric cells containing the liquid electrolyte sandwiched by two (see FIG. 9). Electrochemical potential stability ionic liquid electrolytes with 0 to 0.75 M zinc salt concentrations. The occurrence of a large magnitude current density corresponds to electrolyte decomposition blocking stainless steel electrodes. The neat BMIM+Tf− ionic liquid exhibited an ionic conductivity of 3.15 mS/cm.

Figure 10:
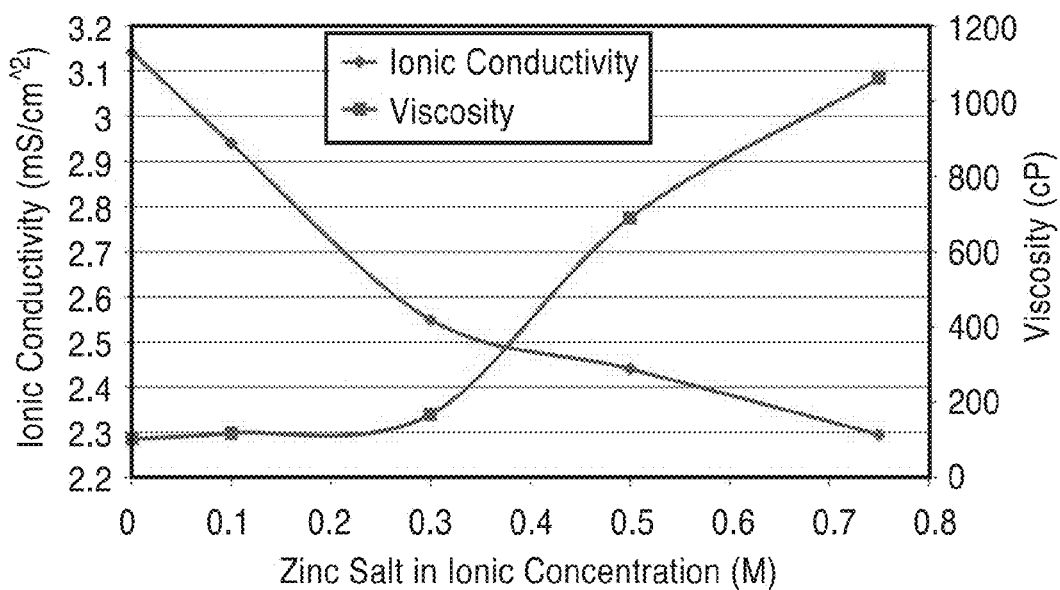
FIG. 10 shows the ionic conductivity and viscosity of an ionic liquid electrolyte as a function of zinc salt concentration.

With increased addition of zinc salt to the ionic liquid, a decrease in ionic conductivity was measured. This behavior is counterintuitive, as it would be assumed that an increase in ion concentration in the system would result in an increased ionic conductivity. Conversely, the added ion concentration in an ionic liquid reduces overall ion mobility in the system, as could be detected with a significant viscosity increase; hence an inverse relationship between the two properties is detected and illustrated in FIG. 10.

Ionic conductivity is a function of ion concentration and mobility. Though the concentration of ions in the ionic liquid electrolyte is increased with greater salt concentration, the mobility of the system is greatly reduced.

Similarly, the electrolyte's zinc ion diffusion coefficients measured using restricted diffusion methods showed a diminishing trend with increased zinc salt concentration. This trend can also be attributed to the escalation of electrolyte viscosity with added zinc salt concentration. A comparison of these transport property trends with an analogous lithium ion. ionic liquid system can provide additional empirical observations on how the divalent nature and relative size of the zinc ion may affect its behavior in an ionic liquid electrolyte. Note that the lithium electrolyte is solely composed of lithium ions (Li$^+$), imidazolium-based cations (BMIM$^+$), and trifluoromethanesulfonate anions (Tf$^-$ the zinc electrolyte constituents are zinc ions (Zn$^{2+}$), BMIM$^+$ cations, and Tf$^-$ anions.

Figure 11:
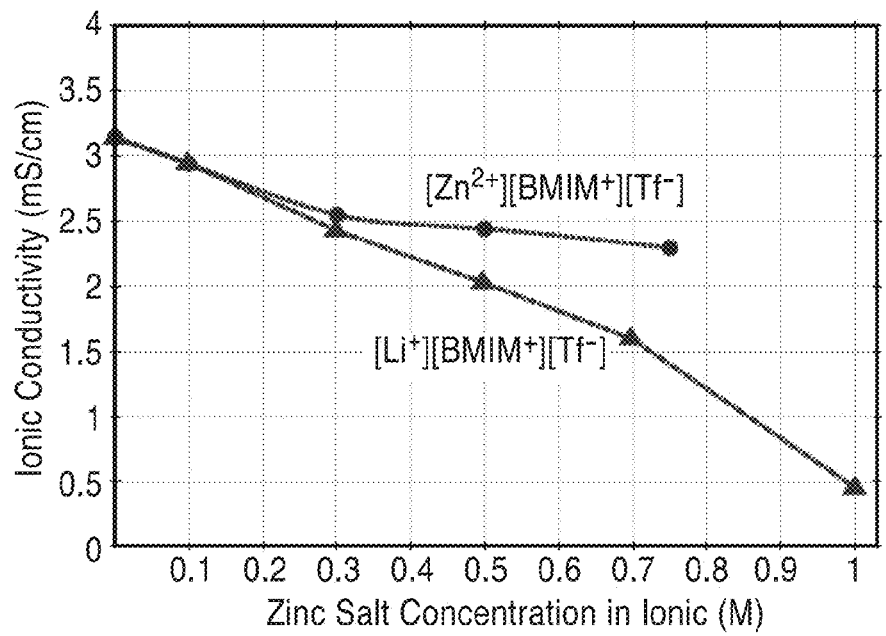
FIG. 11 illustrates the comparison of ionic conductivities of zinc and lithium ion—ionic liquid electrolyte systems with respect to ionic concentration.

The ionic conductivities of the BMIM$^+$Tf$^-$ ionic liquid with varying concentrations of lithium trifluoromethanesulfonate salt were measured in the same manner described with the zinc system and plotted in FIG. 11. At salt concentrations below 0.3M, both systems showed similar ionic conductivities, but as more salt was added to the electrolytes, their behaviors diverged. In both electrolytes, the ionic conductivity decreased with increasing salt concentration, but the conductivity of the lithium system diminished at a more rapid rate. This observation is counterintuitive for two reasons; firstly the size of a lithium ion is smaller than a zinc ion (the ionic radiuses are 0.68 nm and 0.74 nm, respectively), therefore we would expect reduced ionic conductivity in the zinc system due to the sluggish transport of the larger zinc ions.

The differences in ionic conductivity behaviors with respect to solute concentration for the lithium and zinc ionic liquid electrolyte systems depend heavily on the population of trifluoromethansulfonate ions in the electrolyte. The lithium-based ionic liquid electrolyte differs from the zinc-based ionic liquid electrolyte due to the different valences of the solute cations. For every mole of zinc salt, Zn+ (Tf−)$_2$, to a given volume, the volume will contain two moles less of BMIM+Tf−. For one mole of lithium salt, Li+Tf−, to the same volume, there will be only one mole less of BMIM+Tf−. These statements are possible assuming that the cationic volumes in the electrolyte are equal. As a result, the zinc-based ionic liquid electrolyte demonstrates higher ionic conductivities and lower viscosity than the lithium-based ionic liquid electrolyte.

Figure 12:
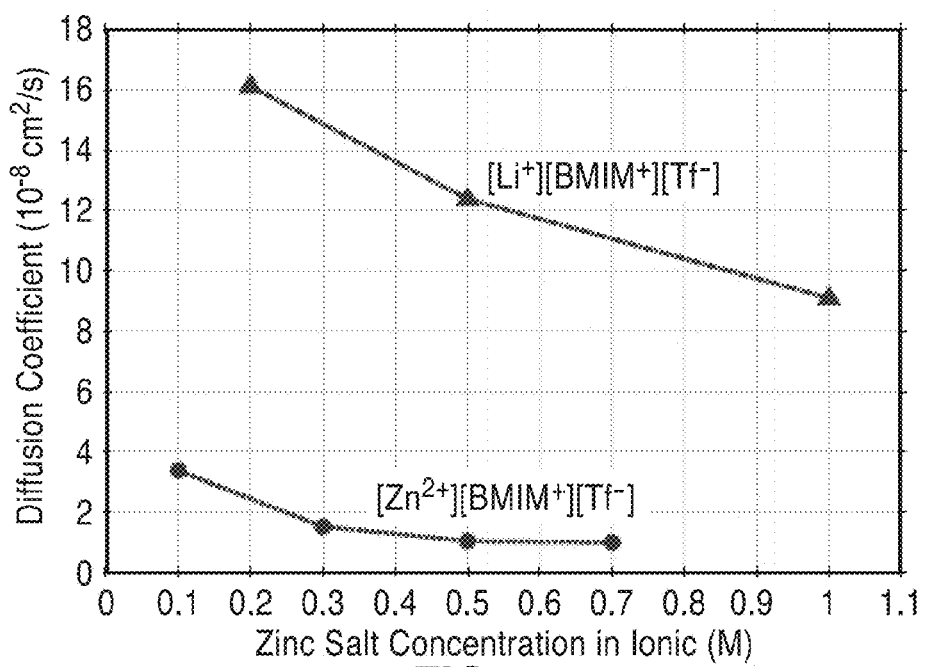
FIG. 12 shows comparison of diffusion coefficients of the active ions in zinc and lithium ion—ionic liquid electrolyte systems.

A comparison of the diffusion coefficients of the active ions with respect to salt concentration in the ionic liquid electrolyte was conducted. From the data exhibited in FIG. 12 taken using the restricted diffusion measurement method, lithium ions are shown to have diffusion coefficients an order of magnitude greater than zinc ions in the ionic liquid electrolyte for all salt concentrations. This suggests that though the [Zn$^{2+}$][BMIM$^+$][Tf$^-$] system exhibits an overall higher ionic conductivity than [Li$^+$][BMIM$^+$][Tf$^-$], the zinc ion transport mechanism in the ionic liquid may differ from that of a lithium ion. With a divalent charge, a zinc cation may interact more strongly with neighboring $Tf^-$ anions, creating ion complexes tethering pairs, trios, and plausibly more anions. These ion complexes however, may be freeing the large [$BMIM^+$] cations in the [$Zn^{2+}$]-[$BMIM^+$][$Tf^-$] system, allowing their rapid transport within the electrolyte, and as a consequence, contributing to higher overall ionic conductivities, and altering the divalent zinc cation transport mechanism through the ionic liquid electrolyte medium in comparison to a monovalent ion.

Figure 13:
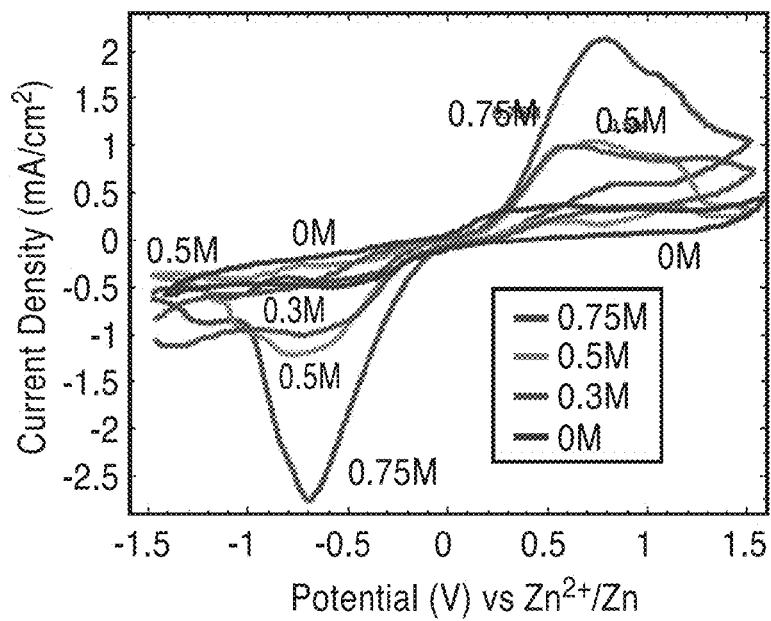
FIG. 13 is a plot of voltammagrams of ionic liquid electrolytes with zinc salt concentrations ranging from 0 to 0.75 M.

The reversibility of the zinc dissolution ($Zn \rightarrow Zn^{2+}+2e^-$) and converse deposition reactions across a zinc electrode and electrolyte interface as a function of electrolyte concentration were determined by comparing their respective current densities measured using cyclic voltammetry of symmetric cells sandwiching the electrolyte between two zinc electrodes. A scan rate of 10 mV/s was used. The voltammograms of ionic liquid electrolyte with zinc salt concentrations ranging from 0 to 0.75 M are displayed in FIG. 13. The largest magnitudes of the anodic (positive) and cathodic (negative) current densities occur at 0.73 V and −0.69 V, and correspond to the maximum rate of dissolution and deposition occurring at the working electrode, respectively; the magnitude of the current density peaks are 2.21 mA/cm$^2$ and −2.63 mA/cm$^2$. The efficiency of the reaction, calculated by comparing the ratio of the anodic and cathodic current densities, is 84%. The voltammogram illustrates that zinc ions are able to transport through the ionic liquid electrolyte and then plate and strip onto or away from an zinc electrode. Therefore the ionic liquid is a candidate electrolyte for a zinc ion battery. With added zinc salt, the maximum anodic and cathodic current densities showed an increasing trend.

Figure 14:
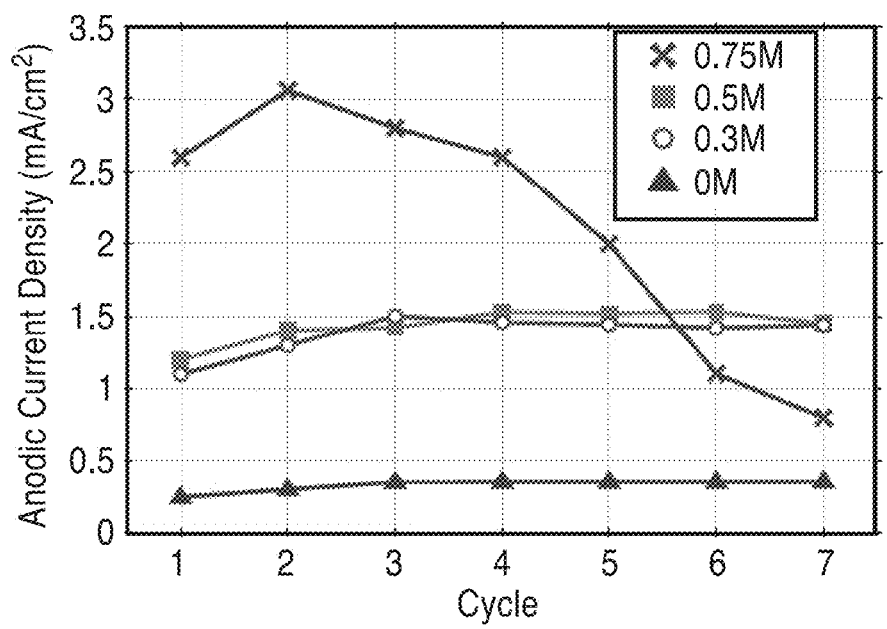
FIG. 14 illustrates cyclic behavior of the peak zinc dissolution current densities measured from ionic liquid electrolytes with zinc salt concentrations of 0 to 0.75 M.

The cycle magnitudes of the anodic peak current densities for the ionic liquid electrolytes with varying zinc salt concentrations are shown in FIG. 14. The magnitudes of the dissolution reaction were recorded for multiple cycles. The electrolytes with concentrations between 0.1-0.5 M showed relatively similar peak anodic current densities when cycled repeatedly; for 0.75 M zinc salt concentration, the electrolyte was unable to demonstrate steady cycling behavior, and a decrease of approximately 70% in the peak anodic current density occurred within the first seven cycles. This trend was also observed in the cathodic sweep. From these studies, it was empirically determined that a 0.5 M zinc salt concentration in BMIM+Tf− exhibited desirable electrochemical and physical properties and was used as the ionic liquid electrolyte in all future experiments.

Figure 15:
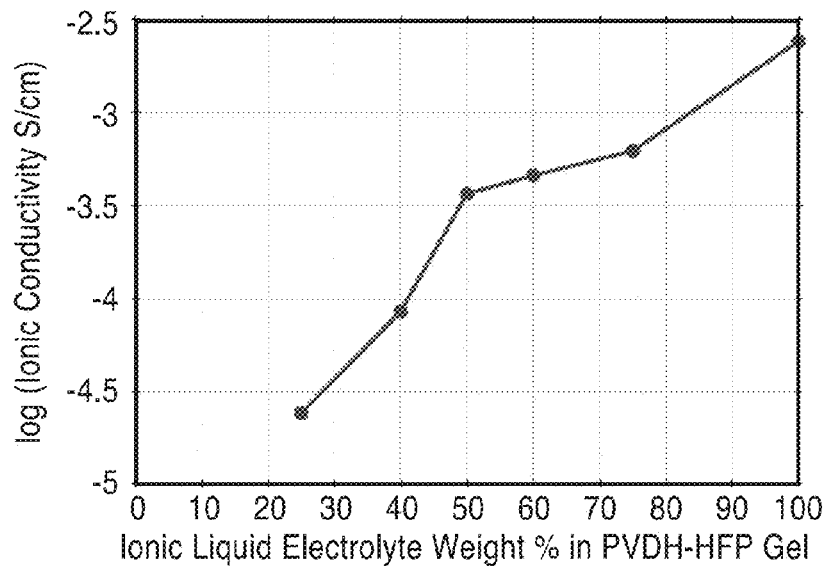
FIG. 15 shows room temperature ionic conductivities of gels with varying ionic liquid concentrations in PVDF-HFP.

The bulk transport properties of the ionic liquid gels were analyzed to determine an optimal gel electrolyte composition. The ionic conductivities of the gels were measured with EIS on symmetric cells formed by casting the gels between two blocking stainless steel electrodes. The gel film thicknesses were measured subsequently with digital calipers and verified using microscopy. The room temperature ionic conductivities of the gels (FIG. 15) were found to increase with higher ionic liquid electrolyte concentration. A gel composition of 1:1 ionic liquid electrolyte to PVDF-HFP weight ratio was determined to have optimal mechanical integrity and transport properties. At this composition, the room temperature gel ionic conductivity (0.37 mS/cm) is reduced an order of magnitude lower than the neat ionic liquid (2.4 mS/cm), however the gel is considered fairly conductive compared to dry polymer (0.01 mS/cm) and glassy (<10 µS/cm) electrolyte Zinc ions were demonstrated to be able to travel through an ionic liquid electrolyte, with an optimal formula that maximized its transport, viscosity, and electrochemical properties.

The zinc salt and ionic liquid solution was swelled into a polymer binder to form a gel electrolyte. The printable gel retains liquid-like ion transport properties, but acts like a solid film that can be flexed and compressed without damage. Furthermore, because of its negligible volatility, the ionic liquid does not "sweat" from the gel and is able retain its properties over long times even when exposed to the ambient.

Figure 16:
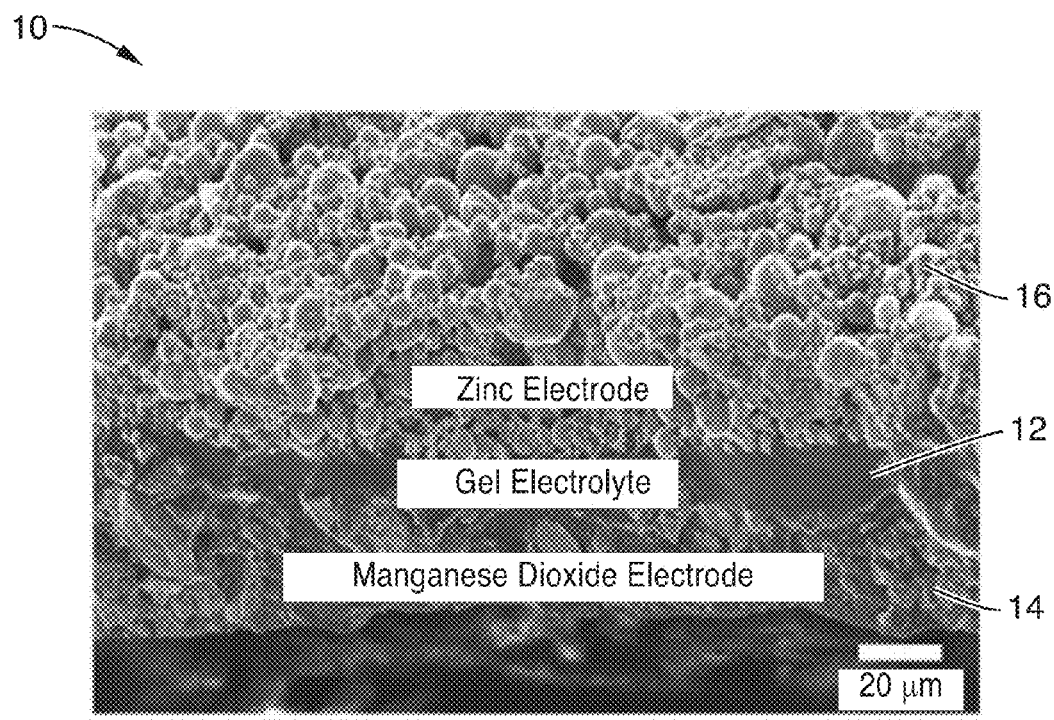
FIG. 16 is a micrograph of the cross section of a zinc, gel electrolyte, and manganese dioxide printed microbattery. The nickel foil current collector was removed so that the printed structure could be imaged.

A micrograph of the cross section of a printed microbattery 10 is shown in FIG. 16. Each film was printed and then dried at 60° C. for 15 to 30 minutes. Square test cells were printed within 0.25 cm$^2$ footprint areas and had total thicknesses between 80 and 120 µm. For this configuration, the zinc film 16 serves both as the electrode but also as its own current collector. Nickel foil was used as the current collector of the manganese dioxide electrode 14 as well as the substrate upon which the battery was printed on. Although it is well within the scope of this technology to utilize a printed nickel current collector to achieve a fully printed battery, the current microbattery configuration emulates the likely circumstance in which the microbattery will be printed onto a patterned substrate such as a PCB board in which the bottom current collector is already fabricated through previous processes such as vapor deposition.

A microbattery cell was fabricated as follows: Electrode films were deposited as slurries composed of powders, additives, a common polymer binder, and a removable solvent that tailors the viscosity of the ink. The polymer binder and solvent used were poly(vinylidene fluoride-hexafluoropropylene), (PVDF-HFP from Kynar Flex 2801), and n-methyl-2-pyrrolidone (NMP from Sigma Aldrich), respectively. The zinc electrode was 95 wt % zinc powder (Alfa-Aesar) and 5 wt % PVDF-HFP. Manganese dioxide ($MnO_2$) electrodes were 90 wt % activated $MnO_2$ powder (Alfa Aesar), 6 wt % acetylene black conductive filler (Alfa Aesar), and 4 wt % PVDF-HFP. The gel electrolyte was a 1:1 mixture of PVDF-HFP and a 0.5 M solution of zinc trifluoromethanesulfonate ($Zn^+Tf^-$) salt dissolved in a 1-butyl-3-methylimidazolium trifluoromethanesulfonate ($BMIM^+Tf^-$) ionic liquid. The inks were printed into designated patterns, and multiple films were deposited successively to form a stacked microbattery configuration as shown in FIG. 16.

The cell was 0.49 cm$^2$ in size, and the electrode dimensions ranged between 50 and 80 µm. Electrolyte thicknesses were between about 15 and 30 µm. The zinc slurry served as both the electrode and its own current collector, while a nickel foil substrate was used as the current collector of the manganese dioxide electrode.

Figure 17A:
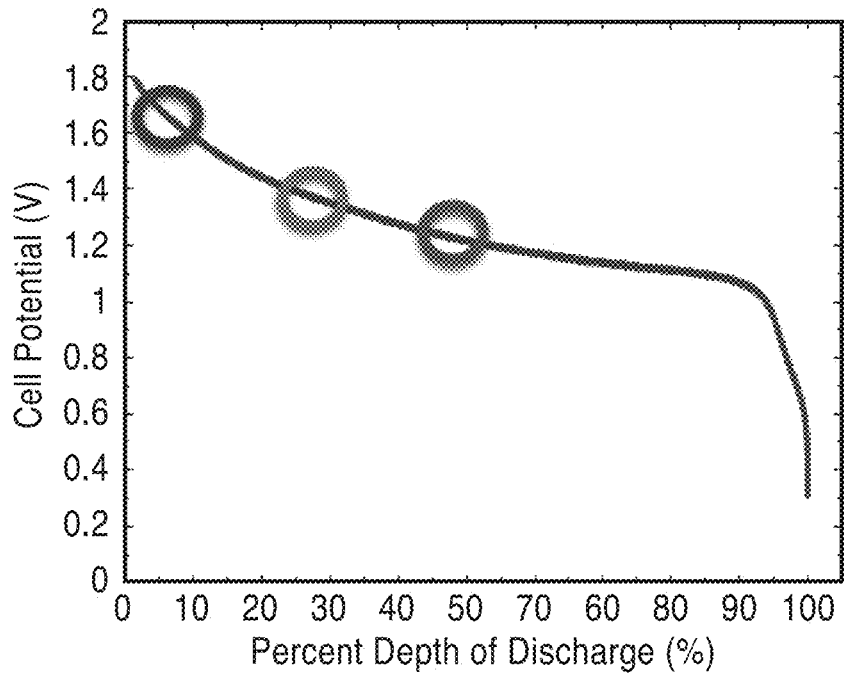
FIG. 17A illustrates cell potential of a printed zinc, gel electrolyte, and $MnO_2$ microbattery as a function of percent depth of galvanostatic discharge. The discharge rate was C/3.
Figure 17B:
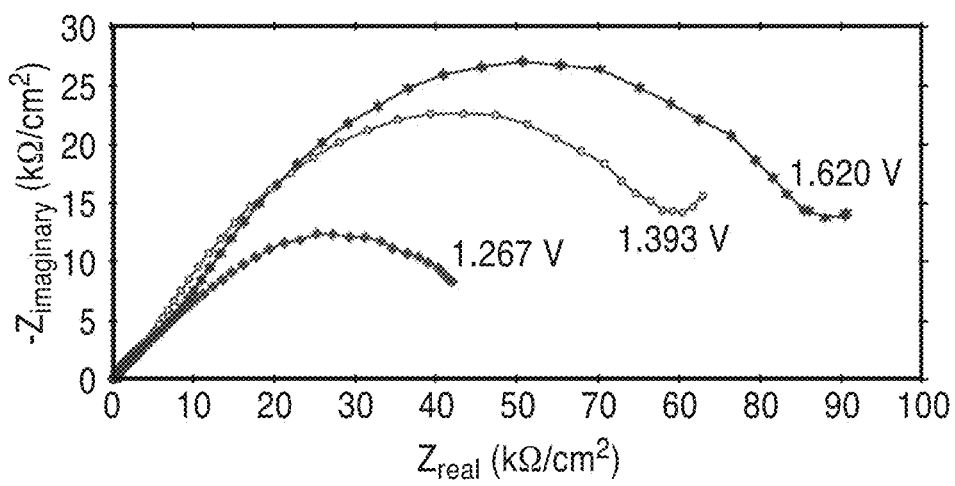
FIG. 17B shows charge impedance spectra corresponding to equilibrium cell potentials of the three of the points illustrated in the plot of FIG. 17A (1.267 V, 1.393 V, and 1.620 V) of a printed zinc, gel electrolyte, and $MnO_2$ microbattery.

After printing the stacked battery structures, the devices were allowed to equilibrate over 24 hours before characterization. The typical cell potential evolution of the printed battery as a function of depth of discharge for a galvanostatic discharge rate of C/3 is shown in 17A. The working range of this battery lies between 1 and 2 V. The cell's impedance spectra from the discharge routine were recorded. Of the phenomena contributing to the cell impedances, the mixed contributions of the charge transfer kinetics and diffusion appear to be most profoundly affected by the cell's steady state voltage. This is supported by the EIS spectra of the charge scans compared in FIG. 17B. With increasing cell potential from 1.267 to 1.620 V, the charge transfer and diffusion semi-circles elongate and expand with the same trend as the discharge scan.

An $MnO_2$ composite electrode test structure was also galvanostatically cycled against a zinc foil electrode. For many cells that were tested, it was observed that with a moderately slow charge and discharge rate (between C/2 to C/5), an activation process occurred within the initial cycles.

This is usually manifested in a significant capacity increase within the first 25 galvanostatic cycles. As seen in FIG. 18, the printed battery's discharge capacity increased more than two-fold between cycles 7 and 9, and maintains this storage capacity with further cycling. A comparison of the charge and discharge curves for cycle 3 and cycle 11 are shown in FIGS. 19A and 19B. Note that when comparing the two cycles, not only do cycle 11's charge and discharge potential curves lengthen two-fold with depth of discharge, the shape of the curve is also altered: a sharp knee is visible upon charge at 1.52 V, and a steeper vertical decline occurs when switching between charge and discharge. The former feature suggests that the manganese dioxide electrode undergoes an activation process induced by the insertion of zinc ions, which may be causing the crystalline material to increase in volume or undergo a phase change. This phase change is accompanied by an enhanced accessibility to interfacial sites upon which zinc ions may react, and therefore an increase in storage capacity as well as a larger ohmic drop when switching current directions. The latter feature, an increased ohmic resistance in the cell with cycling, is consistent with the activation phenomenon; the amorphous phase of manganese dioxide may be more electronically resistive than the crystalline phase or a morphology change may have occurred, causing a disruption in electronic pathways through the electrode film.

The cells were cycled galvanostatically at discharge rates of C/5, and as seen in FIG. 20, over 70 cycles were achieved without sign of performance degradation. This printed battery also showed similar activation behavior of its manganese dioxide electrode within the first 15 cycles. Test cells achieved an average of 1 mAh/cm$^2$ in capacity and 1.2 mWh/cm$^2$ in areal energy density Initial studies on the rate performance of the printed battery are shown in FIG. 21. Deep galvanostatic discharge capacities were measured for varying discharge current densities, and normalized with respect to its maximum capacity (approximately 1 mAh/cm$^2$). The cells were charged using the same algorithm: a constant current charge of 0.1 mAh/cm$^2$ followed by holding the cell at a constant voltage of 1.8 V for 3 hours. Cells were discharged between 1.8 to 0.3 V. The maximum achievable storage capacity is attained for discharge current densities between 0.1 and 1 mA/cm$^2$, which corresponds to approximately C/2-C/7 rates. For current densities higher and lower than this range, the extractable discharge capacity diminishes due to the high cell impedance for the former, while self-discharge and leakage mechanisms dominate the latter. For microdevice applications, it is unlikely the microbattery will be discharged at a rate lower than C/10, even if used in conjunction with an energy harvesting device. On the other hand, high rates of discharge are likely, and the rapid decrease in usable capacity for any rates above 1C prevents this device from suitably addressing the exacting high power pulses typically demanded from microdevices such as wireless sensors. A load leveling capacitor may alleviate such high power density demands, and protect the battery from detrimental pulsing.

Accordingly, it the current density output of the device was shown to range between 0.001 mA/cm$^2$ and 100 mA/cm$^2$.

In one embodiment, the environmental stability of ionic liquid gel electrolyte exposed to the ambient environment at room temperature 20° C. outputs a measureable current density of less than 25 μA/cm$^2$, or preferably less than 15 μA/cm$^2$, and is maintained at least greater than 1 week of exposure, or preferably greater than 3 months of exposure, and more preferably greater than 6 months of exposure.

In one embodiment, the environmental stability of ionic liquid gel electrolyte exposed to elevated temperatures between 20° C. and 45° C. outputs a current density of less than 50 μA/cm$^2$, or preferably less than 25 μA/cm$^2$, or more preferably less than 15 μA/cm$^2$, and is maintained at least greater than 1 day of exposure, or preferably greater than 1 week of exposure, and more preferably greater than 3 months of exposure.

In one embodiment, the environmental stability of ionic liquid gel electrolyte exposed to elevated temperatures between 45° C. and 90° C. outputs a current density of less than 75 μA/cm$^2$, or preferably less than 50 μA/cm$^2$, or more preferably less than 40 μA/cm$^2$, and is maintained at least greater than 1 day of exposure, or preferably greater than 1 week of exposure, and more preferably greater than 1 month of exposure.

In one embodiment, the environmental stability of ionic liquid gel electrolyte exposed to elevated temperatures greater than 90° C. outputs a current density of less than 75 μA/cm$^2$, or preferably less than 50 μA/cm$^2$, and is maintained for at least greater than 1 millisecond of exposure, or preferably greater than 1 hour of exposure, of more preferably greater than 1 day of exposure.

In one embodiment, the environmental stability of ionic liquid gel electrolyte exposed to depressed temperatures between −20 to 20° C. outputs a current density of less than 50 μA/cm$^2$, or preferably less than 25 μA/cm$^2$, or more preferably less than 15 μA/cm$^2$, and is maintained at least greater than 1 day of exposure, or preferably greater than 1 week of exposure, and more preferably greater than 3 months of exposure.

In one embodiment, the environmental stability of ionic liquid gel electrolyte exposed to elevated temperatures less than −20° C. outputs a current density of less than 75 μA/cm$^2$, or preferably less than 50 μA/cm$^2$, and is maintained for at least greater than 1 millisecond of exposure, or preferably greater than 1 hour of exposure, of more preferably greater than 1 day of exposure.

In one embodiment, the environmental stability of ionic liquid gel electrolyte exposed to relative humidity levels between 30-80% outputs a current density of less than 75 μA/cm$^2$, or preferably less than 50 μA/cm$^2$, or more preferably less than 25 μA/cm$^2$, and is maintained at least greater than 1 day of exposure, or preferably greater than 1 week of exposure, and more preferably greater than 3 months of exposure.

In one embodiment, the environmental stability of ionic liquid gel electrolyte exposed to relative humidity levels greater than 80% outputs a current density of less than 75 μA/cm$^2$, or preferably less than 50 μA/cm$^2$, and is maintained at least greater than 1 day of exposure, or preferably greater than 1 week of exposure, and more preferably greater than 1 month of exposure.

In one embodiment, the environmental stability of ionic liquid gel electrolyte exposed to relative humidity levels less than 20% outputs a current density of less than 75 μA/cm$^2$, or preferably less than 50 μA/cm$^2$ or more preferably less than 25 μA/cm$^2$, and is maintained at least greater than 1 day of exposure, or preferably greater than 1 week of exposure, and more preferably greater than 3 months of exposure.

It is appreciated that the above environmental stability ranges are measured with respect to cyclic voltammetry applied and measured between 3 to 3V with a pair of blocking electrodes such as stainless steel, nickel, or aluminum.

The affect of the power density drawn from the printed microbattery on its discharge time was calculated and plotted in FIG. 22. As has been reported for other electrochemical systems, when plotted on logarithmic axes, the discharge time decreases linearly with greater applied power density. With a 15 mW/cm² pulse, the battery fully discharged in approximately 150 seconds. A maximum energy density of 1.49 mW/cm² is achieved for moderate power densities between 0.05-1 mW/cm², and beyond this window, the energy density diminishes. From this plot a maximum power density can be approximated as the value at which only 75% of the battery's energy density is drawn; the maximum power density is 2 mW/cm².

For applications in which the recharge of the battery occurs infrequently or with unknown intermittency, the battery's self-discharge behavior (also known as leakage) is a critical property to investigate. By definition self-discharge in a battery is the progressive time dependent loss of charge typically due to coupled faradaic processes occurring at the anode and cathode.

The rates and mechanisms of self-discharge in a battery can vary greatly with cell potential. To determine the mechanism of self-discharge, the most common method is to monitor a cell's potential decay after polarizing it for a short time. For this experiment, there is no external circuit for charge to pass; therefore the rate of decreasing state of charge must primarily depend on the self-discharge processes within the cell. The potential decay behavior can be used to distinguish between three types of self-discharge mechanisms: (1) self-discharge due to coupled faradaic processes at the anode and cathode (2) diffusion controlled self discharge of electroactive impurities, or (3) short circuit leakage between the electrodes. For the first process where self-discharge is attributable to faradaic reactions, for example due to the continued solution decomposition in a cell after being overcharged, the leakage current (self-discharge) measured at a cell potential (V) is approximated as.

The potential decay of the battery after being exposed to charge pulses (with a positive current) is recorded in FIG. 23. The initial cell potential ($V_{initial}$) at t=0 s corresponds to the potential the cell was polarized to during the charge pulse, and the cell is shown to relax and equilibrate to a lower potential after 5 hours or 18,000 seconds. Over sixty charge pulses were applied to the battery leading to a gradual increase in cell potential from 1.5 to 2.2 V. The plots of the cell's potential decay showed a gradual trend marching upwards due to the increased addition of charge to the system. To determine the mechanism of self-discharge, the cell potential was plotted in FIG. 24 and FIG. 25 with respect to the logarithm and square root of time, corresponding to faradaic and diffusion controlled leakage mechanisms, respectively. Comparing the two figures, the self-discharge in the printed battery is of faradaic origin due to coupled reactions at the anode and cathode rather than due to the diffusion of redox active impurities.

In FIG. 26, the slopes of these linear sweeps (dE/d[log(t)]) were graphed with respect to the initial cell potential the battery was polarized to; the negative slopes correspond to the rate of potential decay in the battery, and a trend of increased self-discharge rate (or greater magnitude of dE/d[log(t)]) with higher polarization cell potential is apparent. The contrast in rates of self-discharge for cell potentials between 1.5 to 2.2 V indicates that the relative parasitic redox reactions occurring at the anode and cathode vary substantially with the cell's state of charge. Studies utilizing a reference electrode may elucidate the magnitudes of leakage contributions and mechanisms of self-discharge at each electrode. By subjecting the cell to a discharge pulse of opposite polarity but of the same magnitude and length of time as the potential decay study above, the battery demonstrated interesting "recovery" behavior. What was observed in FIG. 27 was a gradual increase in the cell's potential when it was allowed to rest at open circuit after a discharge pulse. As was applied in the self-discharge study, the relationship between cell potential and time was used to distinguish the mechanism of self-recovery.

By plotting the cell potential data as a function of the logarithm FIG. 28 and the square root of time FIG. 29, the linear behavior visible in FIG. 29 suggests that the recovery mechanism is not diffusion controlled, but rather dependent on the faradaic reactions of species at the anode and cathode; the mechanism of self-recovery is consistent with the self-discharge study. This observation is contrary to popular hypotheses on the recovery effect of batteries, which is typically attributed to the diffusion of electroactive ions in the electrolyte towards the electrodes to compensate for the large concentration gradients formed during rapid polarization of the battery.

A complementary study to determine the voltage dependence of the leakage behavior in an electrochemical system is the float current technique. The float current is the current needed to maintain the electrodes at a cell potential. The float current exactly matches the magnitude of the spontaneous self-discharge current flowing in the cell and therefore prevents the parasitic currents from diminishing the cell's state of charge. To determine the voltage dependence of the printed battery's leakage, the cell's potential was held for eight hours and its current response was measured. At the onset of holding the cell at a certain voltage, the resulting current response exhibits its maximum value and then gradually decays over time until it reaches steady state.

An example of the current measured in a printed battery held at 1.65 V is shown in FIG. 30. The float current is estimated as the current measured after eight hours of holding the cell at a given potential, and assumed to be equal in magnitude to the leakage currents occurring spontaneously in the cell. The amount of charge passed due to these parasitic mechanisms is determined by integrating the area under the current response curves, and from this a leakage power can be calculated. For the printed battery, the study was conducted over two subsequently measured charge and discharge cycles. The charge cycle float currents recorded for cell potentials between 1.1 and 2 V showed an increasing trend with increasing state of charge. Both first and second charge cycles exhibited very similar leakage current quantities as well as increasing trends with escalating applied cell potential. A considerable spike in float current between 1.62 and 1.84 V was detected in both cycles, possibly indicating a repeatable leakage mechanism dependent on the state of charge (such as the electrochemical breakdown of an electrolyte constituent).

From the current measurements of the printed batteries, the charge passed potentiostatically (FIGS. 31 and 32) was also plotted. The trends for the measured charge and power passed during the charge and discharge cycles matched that of the float current with cell potential, and in general the measured properties of the first and second cycle exhibited similar values. The leakage power upon charge varied between 0 to 6.4 µW/cm², while upon discharge, the maximum leakage power measured was 2.5 µW/cm². The average leakage power measured in the printed battery was 1.38 µW/cm².

A study of the moisture tolerances of various electronics devices was also conducted. Devices which have minimal to moderate moisture tolerances can be packaged with as little as a single layer barrier such as polyimide, silicone, glass, or a metal oxide film. For devices incorporating organic materials that are environmentally sensitive such as organic light emitting diodes (OLEDs) and organic transistors, the moisture tolerances, measured by the water vapor transmission rate (WVTR), of these devices are very low ($<10^{-3}$ g/m²/day). These devices require much more sophisticated barriers such as multilayer structures alternating with organic and inorganic materials. According to a simple estimation, a lithium battery can tolerate a WVTR no greater than $10^{-4}$. The estimation stems from the following relationship: WVTR is equal to the thickness of sensitive component in battery, multiplied by its density, and divided by desired lifetime. For a lithium battery where a 3.5 μm thick lithium electrode is the most environmentally sensitive component and the battery must last 10 years, an assumption of a 1:1 mass reactant ratio results in an WVTR estimation of $5*10^{-4}$ g/m²/day. The WVTR of a lithium battery is equal to $5\times10^{-4}$ g/m²/day. If this were adjusted to account for a 1:1 mole reaction ratio, this reduces the WVTR further below $1*10^{-5}$ g/m²/day for the same battery and lifetime requirement.

Various current collector material were also tested for compatibility and stability with the gel electrolyte of the present invention.

FIG. 33 shows voltammograms of symmetric cells containing two adjacently printed or patterned copper, silver, nickel and aluminum current collector films, each covered in the printed gel electrolyte 12 of the present invention. The electrochemical stabilities/instabilities of copper, silver, nickel and aluminum in the gel electrolyte correspond with the magnitude of current density detected for a given potential.

As shown in FIG. 33, the copper and silver current collectors were shown to be electrochemically unstable, demonstrating a leakage current in the ionic liquid electrolyte>50 μA/cm² at potentials greater than 0.5V and less than −0.5V.

Using a planar test cell, an ink composed of 93 wt. % spherical nickel powder [E-Fill, Sulzer Metco Canada] and 7 wt. % PVDF-HFP was subjected to a 10 mV/s CV scan rate between −2 to 2 V. The nickel exhibited fairly stable behavior with the gel electrolyte, with negligible current densities and no morphology changes detected at the current collector interfaces over 25 cycles.

Aluminum current collectors having thickness between 1 μm and 80 μm and material composition of aluminum foil, aluminum nanoparticles, or aluminum composites where aluminum powder is mixed with a polymer binder was deposited or adhered to a plastic or glass substrate. It is appreciated that the aluminum current collector may also be deposited or patterned using die cutting, screen printing, dispenser printing, ink jet printing, or cold-foil or hot-foil printing methods. As shown in FIG. 33 an aluminum foil current collector also showed stability across the range of range of −3 to 3 V.

FIG. 34 shows voltammograms showing stability at various temperatures of which the aluminum foil current collectors and gel electrolyte were exposed to. Stability was shown for temperatures ranging from 25° C. to 125° C.

3. Printed Capacitor

An electrochemical capacitor was fabricated using the printing method illustrated in FIGS. 35A through 35C. At step 122 shown in FIG. 35A, a first carbon electrode layer 132 is printed directly onto the substrate 68. Carbon electrode layer 132 is printed onto the substrate 68 as a first ink dispenser 140 passes over the substrate 68. At step 124 shown in FIG. 35B, a gel electrolyte layer 134 is printed directly onto the first carbon electrode layer 132 as a second ink dispenser 142 passes over the first carbon electrode layer 132. At step 126 shown in FIG. 35C, a second carbon electrode layer 136 is printed directly onto the gel electrolyte layer 134 as a third ink dispenser 144 passes over the gel electrolyte layer 134.

FIG. 36 shows a micrograph of a printed capacitor 130 cross section printed according to the method of FIGS. 35A-C. The cross section shows a first carbon electrode 132 spaced apart from a second carbon electrode by a gel electrolyte 134.

The carbon electrochemical capacitor electrode inks of the capacitor 130 shown in FIG. 36 comprised composite slurries composed of 50 wt. % activated high surface area carbon powder, 2 wt. % conductive carbon additives, 24 wt. % conductive carbon additives, 24 wt. % polyvinylidene fluoride (PVDF) polymer binder, and 24 wt. % tetrafluoroborate (BMIM+BF$_{4-}$) ionic liquid electrolyte. The slurry's rheology was tailored using N-methylpyrrolidone (NMP) solvent, which later evaporates upon drying. The capacitor's gel electrolyte 134 is composed of equal parts PVDF and the BMIM$^+$ BF$_4^-$. Commercial foils of stainless steel and nickel were used as current collector films. All inks are mixed until homogenous, and then deposited sequentially in the configuration shown in FIGS. 35A-C. Between film deposition steps the films were dried at 70° C. for 20 minutes. The typical substrate used for these tests structures was glass.

It should be noted that the gel electrolyte 134 of the capacitor 130 of FIG. 36 used a significantly different composition than the electrolytic gel 12 of the battery 10 illustrated in FIG. 1. While not tested, it is appreciated that an electrolytic gel similar to the battery 10 illustrated in FIG. 1 may also be incorporated for use with the capacitor 130.

Cyclic voltammetry and electrochemical impedance spectroscopy experiments were conducted with a Gamry Reference 600 Potentiostat/Galvanostat/ZRA. All. AC impedance measurements were taken potentiostatically with a DC voltage of 0V and an AC voltage of 5 mV within a frequency range of 10 mHz-10 kHz. Measurements are normalized using the capacitor footprint area (not the surface area of the electrode) as this area usually is the most restrictive parameter in designing micro-energy storage for small devices.

FIG. 37 shows the cycle life vs. capacitance of the printed electrochemical capacitor 130. FIG. 38 is a plot of the charge and discharge cycle of the printed electrochemical capacitor. FIG. 39 illustrates the pulsed behavior of the printed capacitor 130 at 1 mA, and 0.1 mA.

4. Cell Applications

FIG. 40 illustrates an example of an active RFID tag 150 utilizing the energy storage component 152, thermal or solar energy harvesting component 154, and sensor 156 (e.g. MEMS cantilever sensor). The energy storage component 152 may comprise a printed microbattery, such as cell 10 in FIG. 1, which is printed directly to the circuit board using "printing on green" method described below with respect to FIG. 39.

For applications operating over long device lifetimes (>10 years without the ability to replace its power source if depleted), the incorporation of an energy harvesting device 154 to convert ambient energy to useful electrical energy is paramount. Obstacles to the incorporation of energy harvesting technologies in current devices include its high cost and intermittency of power supplied. The printed microbatteries 10 of the present invention add inherent value to energy harvesting devices because of its simple integration procedure that enables versatile form factors and customizable performance properties. As most energy harvesters are materials, processing, and energy intensive to fabricate, pairing these devices with a low-cost energy storage device that is easily integrated with minimal materials, waste, and energy inputs adds significant utility. More importantly, energy storage bridges discrepancies in power demands with the power supplied by the harvester.

In most applications and environments, the combination of energy harvester 154 and storage device 152, known as a hybrid power supply, are highly desirable. Alone, electrochemical capacitors (e.g. capacitor 130 of FIG. 36) are limited in energy density compared to batteries, but are appropriate for scenarios requiring frequent, high power pulse operation such as in emergency response applications, which rely on rapid real-time information. Electrochemical capacitors 130 are also complementary technology when used with batteries (e.g. battery 10) for applications requiring larger energy storage capacity, and if used in conjunction, the capacitor can address high power surges demanded from the load, effectively mitigating detrimental battery operation and therefore increasing the battery's and consequently the device's lifetimes.

Dispenser printing methods may be used to integrate an energy storage device on the substrate area surrounding MEMS vibration energy harvesters that are microfabricated onto a silicon die. The dispenser printer also offers the added benefit of being able to tailor the energy storage performance properties to be compatible with the power supplied by the energy harvester 154 as well as the power demanded by the load, which both can vary significantly with the environment it is calibrated in.

On a crowded printed circuit board (PCB) with limited unoccupied substrate area, the printing methods of the present invention have the ability to fill any open space with an energy storage component(s), effectively depositing the maximum amount of energy storage within a crowded substrate. This concept, also known as "printing on green," is illustrated in the method 170 shown in FIG. 41.

At step 172, a printed circuit board 184 is provided having various components 182. At step 174 empty space 186 is determined for printing energy storage. At step 176, a device print design 188 is generated based on the available footprint in the PCB 184. At step 178, energy storage device 190 is printed on the board 184 to generate the integrated device shown in step 180. Note that this process is carried out in ambient conditions and minimal post processing temperatures (<150° C.), therefore it avoids damaging any neighboring components that might be sensitive to environmental exposure.

Along with being able to print in inaccessible areas on a crowded substrate, the dispenser printer is also capable of printing conformably on non-planar surfaces (e.g. a curved surface). This adds greater flexibility in where energy storage devices can be integrated on a device. On a crowded substrate, an electrically insulating layer can be printed on top of any components, and then conformably coated with a printed microbattery. Since all fabrication and post-processing of the microbattery occurs at ambient conditions and temperatures under 120° C., all neighboring components should not be damaged in the process.

The capability of depositing custom microbatteries both in the open space as well as conformably on device components provides extensive possibilities for the on-demand fabrication of localized energy storage components. Traditionally, an electronic device obtains its power from a single source, such as a primary battery. If any of its components require different supply voltages, additional power circuitry is needed to convert the battery voltage to its required value. The efficiency of a voltage conversion operation will vary with the type of conversion method used: linear regulators are simple and low-cost, but are very inefficient for large voltage changes, resulting in unwanted heat dissipation. Switched-mode voltage converters (such as switched capacitors) can be designed to be very efficient (>75%) and by using CMOS fabrication, the devices are less area intensive compared to linear regulators, however they are complex to design and integrate. In this discussion it is assumed that a typical wireless sensor contains a microcontroller typically comprised of an oscillator and control unit, a communication component(s) such as a transceiver and/or receiver, a sensor(s), and a power supply.

The use of micro energy storage devices as local supply voltages and power sources can mitigate the design complexities and conversion inefficiencies associated with power regulation as well as reduce the substrate area dedicated power circuitry. Added functionality and areal footprint efficiency is achieved by fabricating stacked series and parallel configurations of microbatteries and capacitors. This should be achievable using dispenser printing, but has yet to be fully demonstrated. Localized energy storage components can be tailored according to their use; rather than pulsing a battery with a cumulatively high power draw derived from the sum of many components, a highly tailored energy storage device can be dedicated to each individual component.

For example, a microcontroller unit typically draws a continual low power (<10 μW) and may be suitably powered by a local microbattery of the chemistry provided herein. On the other hand, a transceiver requires infrequent high bursts of power. This behavior may be better addressed by an electrochemical capacitor (e.g. capacitor 130) or battery chemistry capable of handling high rates of discharge (such as zinc-silver oxide). By exploiting their advantages and separating the energy storage components, the overall cumulative health of the energy storage network may exceed that of traditional single battery powered system. To encourage this design paradigm change, simulations and demonstrations of this concept are needed.

Along with the applications discussed, flexible electronics provides a unique opportunity for printed microbatteries. Relevant markets include low-cost active RFID tags for asset management and printed media. By utilizing polymer-based materials microbatteries 10 of the present invention can be reasonably bent and conformed to non-planar substrates without damage. Furthermore, most flexible substrates are polymer materials which cannot be processed beyond 150-200° C. The printing method of the present invention enables near room temperature deposition and post processing, and are compatible with these substrates.

From the discussion above it will be appreciated that the invention can be embodied in various ways, including the following:

1. An electrochemical cell, comprising an anode layer; a cathode layer; and a non-aqueous gel electrolyte layer coupled to the anode layer and cathode layer; said electrolyte layer providing physical separation between the anode layer and the cathode layer; said gel electrolyte layer comprising a polymer into which at least one ionic liquid and an electrolyte salt have been imbibed; said electrolyte layer comprising a composition configured to provide ionic communication between the anode layer and cathode layer by facilitating transmission of multivalent ions between the anode layer and the cathode layer.

2. An electrochemical cell as recited in embodiment 1, wherein the anode layer, cathode layer, and electrolyte layer comprise flexible, compressible layers capable of deformation without significant loss of performance.

3. An electrochemical cell as recited in embodiment 2, wherein the cell comprises a battery cell.

4. An electrochemical cell as recited in embodiment 3, wherein the battery cell is a rechargeable battery cell.

5. An electrochemical cell as recited in embodiment 1, further comprising: a first current collector in electronic communication with the cathode; and. a second current collector in electronic communication with the anode.

6. An electrochemical cell as recited in embodiment 1, wherein one or more of the anode layer, cathode layer, electrolyte layer and current collectors are configured to be deposited an a substrate in a liquid form, and solidify to at least a semi-solid state after a period of time.

7. An electrochemical cell as recited in embodiment 1, wherein the cell is configured to operate in an ambient environment for over 4 months with no additional packaging.

8. An electrochemical cell as recited in embodiment 1, wherein the polymer network comprises one or more polymer(s) selected from the group consisting of poly(vinylidene fluoride) (PVDF), poly(vinylidene fluoride-hexafluoropropylene) (PVDF-HFP), polyvinyl alcohol (PVA), poly(ethylene oxide) (PEO), poly(acrylo-nitrile) (PAN), and poly(methyl methacrylate) (PMMA), epoxy derivatives, and silicone derivatives.

9. An electrochemical cell as recited in embodiment 1, wherein the electrolyte salt dissolved into the ionic liquid releases cations selected from the group consisting of zinc ions ($Zn^{2+}$), aluminum ($Al^{3+}$), magnesium ($Mg^{2+}$), and yttrium ($Y^{2+}$).

10. An electrochemical cell as recited in embodiment 1, wherein the salt dissolved into the ionic liquid releases anions selected from the group consisting of chlorides, tetrafluoroborate (BF4-), trifluoroacetate (CF3CO2-), trifluoromethansulfonate (CF3SO3-), hexafluorophosphate (PF6-), bis(trifluoromethylsulfonyl)amide (NTf2-), and bis(fluorosulfonyl)imide (N(SO2F)2-).

11. An electrochemical cell as recited in embodiment 1, wherein the ionic liquid is a room temperature salt having cations selected from the group consisting of imidazolium variants, pyrrolidinium variants, ammonium variants, pyridinium variants, piperidinium variants, phosphonium variants, and sulfonium variants.

12. An electrochemical cell as recited in embodiment 11, wherein the ionic liquid is a room temperature salt having anions selected from the group consisting of chlorides, tetrafluoroborate (BF4-), trifluoroacetate (CF3CO2-), trifluoromethansulfonate (CF3SO3-), hexafluorophosphate (PF6-), bis(trifluoromethylsulfonyl)amide (NTf2-), and bis(fluorosulfonyl)imide (N(SO2F)2-).

13. An electrochemical cell as recited in embodiment 1, wherein the anode comprises a component selected from the group consisting of zinc, aluminum, magnesium, and yttrium.

14. An electrochemical cell as recited in embodiment 1, wherein the cathode comprises a metal oxide.

15. An electrochemical cell as recited in embodiment 14, wherein metal oxide comprises a component selected from one or more of the group consisting of vanadium pentoxide ($V_2O_5$), manganese dioxide ($MnO_2$), cobalt oxide ($Co_xO_y$), titanium oxide ($Ti_xO_y$), and lead oxide ($Pb_xO_y$).

16. An electrochemical cell as recited in embodiment 5, wherein the current collectors comprise a metal foil comprising a metal selected from the group consisting of nickel, stainless steel, gold, and aluminum.

17. An electrochemical cell as recited in embodiment 1, wherein the anode layer and the cathode layer each have thicknesses between 8 μm and 60 μm.

18. An electrochemical cell as recited in embodiment 1, wherein the electrolyte has a thickness between approximately 1 μm and 15 μm.

19. An electrochemical cell as recited in embodiment 5, wherein the current collectors comprise printed layers each having thicknesses between 8 μm and 60 μm.

20. An electrochemical cell as recited in embodiment 5, wherein the current collectors comprise metallic foils each having thicknesses between 1 μm and 80 μm.

21. An electrochemical cell as recited in embodiment 1, wherein the liquid electrolyte comprises a zinc salt concentration between 0.2 and 0.75 M in ionic liquid.

22. An electrochemical cell as recited in embodiment 21, wherein the liquid electrolyte comprises a zinc salt concentration between 0.4 and 0.75 M.

23. An electrochemical cell as recited in embodiment 21, wherein the liquid electrolyte comprises a zinc salt concentration between 0.45 and 0.65 M.

24. An electrochemical cell as recited in embodiment 22, wherein the liquid electrolyte has an ionic conductivity above 2.3 mS/cm.

25. An electrochemical cell as recited in embodiment 1, wherein the electrochemical cell has a current density output ranging between 0.001 $mA/cm^2$ and 100 $mA/cm^2$.

26. An electrochemical cell as recited in embodiment 1, wherein the gel electrolyte layer is configured to maintain an output leakage current density of less than 50 $\mu A/cm^2$ while being exposed to temperatures ranging from 20° C. and 45° C. for a period greater than 3 months.

27. An electrochemical cell as recited in embodiment 26, wherein the gel electrolyte layer is configured to maintain an output leakage current density of less than 25 $\mu A/cm^2$ while being exposed to temperatures ranging from 20° C. and 45° C. for a period greater than 3 months.

28. An electrochemical cell as recited in embodiment 27, wherein the gel electrolyte layer is configured to maintain an output leakage current density of less than 15 $\mu A/cm^2$ while being exposed to temperatures ranging from 20° C. and 45° C. for a period greater than 3 months.

29. An electrochemical cell as recited in embodiment 1, wherein the gel electrolyte layer is configured to maintain an output leakage current density of less than 75 $\mu A/cm^2$ while being exposed to temperatures ranging from 45° C. and 90° C. for a period greater than 1 month.

30. An electrochemical cell as recited in embodiment 29, wherein the gel electrolyte layer is configured to maintain an output leakage current density of less than 50 $\mu A/cm^2$ while being exposed to temperatures ranging from 45° C. and 90° C. for a period greater than 1 month.

31. An electrochemical cell as recited in embodiment 30, wherein the gel electrolyte layer is configured to maintain an output leakage current density of less than 40 $\mu A/cm^2$ while being exposed to temperatures ranging from 45° C. and 90° C. for a period greater than 1 month.

32. An electrochemical cell as recited in embodiment 1, wherein the gel electrolyte layer is configured to maintain an output leakage current density of less than 15 $\mu A/cm^2$ while being exposed to ambient environment for a period greater than 6 months.

33. An electrochemical cell as recited in embodiment 1, wherein the gel electrolyte layer is configured to maintain an output leakage current density of less than 50 $\mu A/cm^2$ while being exposed to temperatures ranging from −20° C. and 20° C. for a period greater than 3 months.

34. An electrochemical cell as recited in embodiment 33, wherein the gel electrolyte layer is configured to maintain an output leakage current density of less than 25 $\mu A/cm^2$ while being exposed to temperatures ranging from −20° C. and 20° C. for a period greater than 3 months.

35. An electrochemical cell as recited in embodiment 34, wherein the gel electrolyte layer is configured to maintain an output leakage current density of less than 15 $\mu A/cm^2$ while being exposed to temperatures ranging from −20° C. and 20° C. for a period greater than 3 months.

36. An electrochemical cell as recited in embodiment 1, wherein the gel electrolyte layer is configured to maintain an output leakage current density of less than 75 μA/cm² while being exposed to temperatures less than −20° C. for a period greater than 1 day.

37. An electrolyte configured to provide physical separation between an anode and the cathode of an electromechanical cell, comprising: a room temperature ionic liquid electrolyte and dissolved salt imbibed into a polymer to form a non-aqueous gel; the electrolyte comprising a composition configured to provide ionic communication between the anode and cathode by facilitating transmission of multivalent ions across the electrolyte.

38. An electrolyte as recited in embodiment 37, wherein the electrolyte comprises a polymer into which at least one ionic liquid and an electrolyte salt have been imbibed.

39. An electrolyte as recited in embodiment 37, wherein the polymer comprises one or more polymer(s) selected from the group consisting of poly(vinylidene fluoride) (PVDF), poly(vinylidene fluoride-hexafluoropropylene) (PVDF-HFP), polyvinyl alcohol (PVA), poly(ethylene oxide) (PEO), poly(acrylo-nitrile) (PAN), and poly(methyl methacrylate) (PMMA), epoxy derivatives, and silicone derivatives.

40. An electrolyte as recited in embodiment 38, wherein the ionic liquid is a room temperature salt having cations selected from the group consisting of imidazolium variants, pyrrolidinium variants, ammonium variants, pyridinium variants, piperidinium variants, phosphonium variants, and sulfonium variants, 41. An electrolyte as recited in embodiment 40, wherein the ionic liquid is a room temperature salt having anions selected from the group consisting of chlorides, tetrafluoroborate (BF4-), trifluoroacetate (CF3CO2-), trifluoromethansulfonate (CF3SO3-), hexafluorophosphate (PF6-), bis(trifluoromethylsulfonyl)amide (NTf2-), and bis(fluorosulfonyl)imide (N(SO2F)2-).

42. An electrolyte as recited in embodiment 1, wherein the electrolyte is configured to be disposed in a gel layer having a thickness down to approximately 1 μm.

43. An electrolyte as recited in embodiment 42, wherein the liquid electrolyte comprises a zinc salt concentration between 0.2 and 0.75 M in ionic liquid.

44. An electrolyte as recited in embodiment 43, wherein the liquid electrolyte comprises a zinc salt concentration between 0.4 and 0.75 M.

45. An electrolyte as recited in embodiment 44, wherein the liquid electrolyte comprises a zinc salt concentration between 0.45 and 0.65 M.

46. An electrolyte as recited in embodiment 44, wherein the liquid electrolyte has an ionic conductivity above 2.3 mS/cm.

47. An electrolyte as recited in embodiment 42, wherein the gel electrolyte layer is configured to maintain an output leakage current density of less than 50 μA/cm² while being exposed to temperatures ranging from 20° C. and 45° C. for a period greater than 3 months.

48. An electrolyte as recited in embodiment 47, wherein the gel electrolyte layer is configured to maintain an output leakage current density of less than 25 μA/cm² while being exposed to temperatures ranging from 20° C. and 45° C. for a period greater than 3 months.

49. An electrolyte as recited in embodiment 48, wherein the gel electrolyte layer is configured to maintain an output leakage current density of less than 15 μA/cm² while being exposed to temperatures ranging from 20° C. and 45° C. for a period greater than 3 months.

50. An electrolyte as recited in embodiment 42, wherein the gel electrolyte layer is configured to maintain an output leakage current density of less than 75 μA/cm² while being exposed to temperatures ranging from 45° C. and 90° C. for a period greater than 1 month.

51. An electrolyte as recited in embodiment 50, wherein the gel electrolyte layer is configured to maintain an output leakage current density of less than 50 μA/cm² while being exposed to temperatures ranging from 45° C. and 90° C. for a period greater than 1 month.

52. An electrolyte as recited in embodiment 51, wherein the gel electrolyte layer is configured to maintain an output leakage current density of less than 40 μA/cm² while being exposed to temperatures ranging from 45° C. and 90° C. for a period greater than 1 month.

53. An electrolyte as recited in embodiment 42, wherein the gel electrolyte layer is configured to maintain an output leakage current density of less than 15 μA/cm² while being exposed to ambient environment for a period greater than 6 months.

54. An electrolyte as recited in embodiment 42, wherein the gel electrolyte layer is configured to maintain an output leakage current density of less than 50 μA/cm² while being exposed to temperatures ranging from −20° C. and 20° C. for a period greater than 3 months.

55. An electrolyte as recited in embodiment 54, wherein the gel electrolyte layer is configured to maintain an output leakage current density of less than 25 μA/cm² while being exposed to temperatures ranging from −20° C. and 20° C. for a period greater than 3 months.

56. An electrolyte as recited in embodiment 55, wherein the gel electrolyte layer is configured to maintain an output leakage current density of less than 15 μA/cm² while being exposed to temperatures ranging from −20° C. and 20° C. for a period greater than 3 months.

57. An electrolyte as recited in embodiment 42, wherein the gel electrolyte layer is configured to maintain an output leakage current density of less than 75 μA/cm² while being exposed to temperatures less than −20° C. for a period greater than 1 day.

58. A method of fabricating an electrochemical cell, comprising the steps of: providing a first electrode ink and a second electrode ink; providing liquid electrolyte ink; printing a first electrode layer of the first electrode ink; printing a layer of electrolyte ink; and printing a second electrode layer of second electrode ink; wherein the layer of electrolyte ink that provides physical separation between the first electrode layer and second electrode layer to form an electrochemical cell; and wherein the electrolyte layer is configured to provide ionic communication between the first electrode layer and second layer by facilitating transmission of multivalent ions between the first electrode layer and the second electrode layer.

59. A method as recited in embodiment 58, further comprising: providing a current collector ink; and printing a layer of current collector ink adjacent to one or more of the first electrode layer and the second electrode layer.

60. A method as recited in embodiment 58, wherein the electrochemical cell is fabricated at ambient temperature.

61. A method as recited in embodiment 60, wherein the electrochemical cell is fabricated at ambient pressure.

62. A method as recited in embodiment 58, wherein the inks are liquids selected from the group consisting of solutions, suspensions, and slurries.

63. A method as recited in embodiment 58, wherein the first and second electrode inks comprise slurries of active electrode particles, polymer binder, optional additives, and a solvent(s).

64. A method as recited in embodiment 58, wherein the electrolyte comprises a polymer into which at least one ionic liquid and at least one electrolyte salt have been imbibed.

65. A method as recited in embodiment 64, wherein the polymer comprises one or more polymer(s) selected from the group consisting of poly(vinylidene fluoride) (PVDF), poly(vinylidene fluoride-hexafluoropropylene) (PVDF-HFP), polyvinyl alcohol (PVA), poly(ethylene oxide) (PEO), poly(acrylo-nitrile) (PAN), and poly(methyl methacrylate) (PMMA), epoxy derivatives, and silicone derivatives.

66. A method as recited in embodiment 64, wherein the ionic liquid is a room temperature salt having cations selected from the group consisting of imidazolium variants, pyrrolidinium variants, ammonium variants, pyridinium variants, piperidinium variants, phosphonium variants, and sulfonium variants, 67. A method recited in embodiment 66, wherein the ionic liquid is a room temperature salt having anions selected from the group consisting of chlorides, tetrafluoroborate (BF4-), trifluoroacetate (CF3CO2-), trifluoromethansulfonate (CF3SO3-), hexafluorophosphate (PF6-), bis(trifluoromethylsulfonyl)amide (NTf2-), and bis(fluorosulfonyl)imide (N(SO2F)2-).

68. A method as recited in embodiment 64, wherein the first electrode layer comprises a component selected from the group consisting of zinc, aluminum, magnesium, and yttrium.

69. A method as recited in embodiment 64, wherein the second electrode layer comprises particles selected from the group consisting of a metal oxide.

70. A method as recited in embodiment 58, wherein at least one of said printing steps is done using a direct write dispenser method.

71. A method as recited in embodiment 58, wherein at least one of said printing steps is done using a method selected from the following methods: screen-printing, gravure printing, pad printing, ink jet printing, flexographic coating, spray coating, ultrasonic spray coating, or slot die coating.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. An electrochemical cell, comprising
an anode layer;
a cathode layer; and
a printed non-aqueous gel electrolyte layer coupled to the anode layer and the cathode layer;
said gel electrolyte layer providing physical separation between the anode layer and the cathode layer;
said gel electrolyte layer comprising a polymer into which at least one ionic liquid and an electrolyte salt have been imbibed, said gel electrolyte layer having an amount of said at least one ionic liquid not exceeding 75 wt. %; and
said gel electrolyte layer comprising a composition configured to provide ionic communication between the anode layer and cathode layer by facilitating transmission of multivalent ions between the anode layer and the cathode layer, wherein the electrolyte salt dissolved into the ionic liquid releases multivalent cations selected from ions of at least one of zinc, aluminum, magnesium and yttrium.

2. An electrochemical cell as recited in claim 1, wherein the gel electrolyte layer is capable of withstanding substantial deformation.

3. An electrochemical cell as recited in claim 1, further comprising:
a first current collector in electronic communication with the cathode layer; and
a second current collector in electronic communication with the anode layer.

4. An electrochemical cell as recited in claim 3, wherein the first current collector and/or the second current collector comprises a metal foil comprising a metal selected from the group consisting of nickel, stainless steel, gold, and aluminum.

5. An electrochemical cell as recited in claim 3, wherein the current collectors comprise printed layers each having thicknesses between 8 µm and 60 µm.

6. An electrochemical cell as recited in claim 3, wherein the current collectors comprise metallic foils each having thicknesses between 1 µm and 80 µm.

7. An electrochemical cell as recited in claim 1, wherein the polymer comprises one or more polymer(s) selected from the group consisting of poly(vinylidene fluoride) (PVDF), poly(vinylidene fluoride-hexaflouropropylene) (PVDF-HFP), polyvinyl alcohol (PVA), poly(ethylene oxide) (PEO), poly(acrylo-nitrile) (PAN), and poly(methyl methacrylate) (PMMA), epoxy derivatives, and silicone derivatives.

8. An electrochemical cell as recited in claim 1, wherein the electrolyte salt dissolved into the ionic liquid releases anions selected from the group consisting of chlorides, tetrafluoroborate (BF4-), trifluoroacetate (CF3CO2-), trifluoromethansulfonate (CF3SO3-), hexafluorophosphate (PF6-), bis(trifluoromethylsulfonyl)amide (NTf2-), and bis(fluorosulfonyl)imide (N(SO2F)2-).

9. An electrochemical cell as recited in claim 1, wherein the ionic liquid is a room temperature salt having cations selected from the group consisting of imidazolium, pyrrolidinium, ammonium, pyridinium, piperidinium, phosphonium, and sulfonium.

10. An electrochemical cell as recited in claim 9, wherein the ionic liquid is a room temperature salt having anions selected from the group consisting of chlorides, tetrafluoroborate (BF4-), trifluoroacetate (CF3CO2-), trifluoromethansulfonate (CF3SO3-), hexafluorophosphate (PF6-), bis(trifluoromethylsulfonyl)amide (NTf2-), and bis(fluorosulfonyl)imide (N(SO2F)2-).

11. An electrochemical cell as recited in claim 1, wherein the anode comprises a component selected from the group consisting of zinc, aluminum, magnesium, and yttrium.

12. An electrochemical cell as recited in claim 1, wherein the cathode comprises a metal oxide.

13. An electrochemical cell as recited in claim 12, wherein metal oxide comprises a component selected from one or more of the group consisting of vanadium pentoxide ($V_2O_5$), manganese dioxide ($MnO_2$), cobalt oxide ($Co_xO_y$), titanium oxide ($Ti_xO_y$), and lead oxide ($Pb_xO_y$).

14. An electrochemical cell as recited in claim 1, wherein the anode layer and the cathode layer each have thicknesses between 8 μm and 60 μm.

15. An electrochemical cell as recited in claim 1, wherein the gel electrolyte layer has a thickness between approximately 1 μm and 30 μm.

16. An electrolyte configured to provide physical separation between an anode and a cathode of an electrochemical cell, comprising:
    a room temperature ionic liquid electrolyte comprising an ionic liquid and a dissolved salt, said ionic liquid electrolyte imbibed into a polymer to form a printable non-aqueous gel, and said ionic liquid electrolyte having a concentration of said dissolved salt between 0.3 M and 0.75 M;
    the electrolyte comprising a composition configured to provide ionic communication between the anode and the cathode by facilitating transmission of multivalent ions across the electrolyte, wherein the dissolved salt releases multivalent cations selected from ions of at least one of zinc, aluminum, magnesium and yttrium.

17. An electrolyte as recited in claim 16, wherein the polymer comprises one or more polymer(s) selected from the group consisting of poly(vinylidene fluoride) (PVDF), poly(vinylidene fluoride-hexaflouropropylene) (PVDF-HFP), polyvinyl alcohol (PVA), poly(ethylene oxide) (PEO), poly(acrylo-nitrile) (PAN), poly(methyl methacrylate) (PMMA), epoxy, derivatives and silicone derivatives.

18. An electrolyte as recited in claim 16, wherein the ionic liquid is a room temperature salt having cations selected from the group consisting of imidazolium, pyrrolidinium, ammonium, pyridinium, piperidinium, phosphonium, and sulfonium.

19. An electrolyte as recited in claim 18, wherein the ionic liquid is a room temperature salt having anions selected from the group consisting of chlorides, tetrafluoroborate (BF4-), trifluoroacetate (CF3CO2-), trifluoromethansulfonate (CF3SO3-), hexafluorophosphate (PF6-), bis(trifluoromethylsulfonyl)amide (NTf2-), and bis(fluorosulfonyl)imide (N(SO2F)2-).

20. An electrolyte as recited in claim 16, wherein the ionic liquid has an ionic conductivity of approximately 3.15 mS/cm, and wherein the ionic liquid electrolyte has an ionic conductivity above 2.3 mS/cm.

* * * * *